United States Patent
Lu et al.

(10) Patent No.: US 11,190,978 B2
(45) Date of Patent: Nov. 30, 2021

(54) DATA PROCESSING METHOD, TERMINAL DEVICE, AND NETWORK DEVICE

(71) Applicant: HUAWEI TECHNOLOGIES CO., LTD., Guangdong (CN)

(72) Inventors: Wei Lu, Shanghai (CN); Hui Ni, Beijing (CN); Yan Li, Beijing (CN); Weisheng Jin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 69 days.

(21) Appl. No.: 16/677,843

(22) Filed: Nov. 8, 2019

(65) Prior Publication Data

US 2020/0112881 A1    Apr. 9, 2020

Related U.S. Application Data

(63) Continuation of application No. PCT/CN2017/083668, filed on May 9, 2017.

(51) Int. Cl.
*H04W 28/06* (2009.01)
*H04L 29/08* (2006.01)
*H04W 88/06* (2009.01)

(52) U.S. Cl.
CPC ......... *H04W 28/065* (2013.01); *H04L 69/322* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 10,448,239 B2* | 10/2019 | Faccin | ............ | H04W 8/08 |
| 10,531,420 B2* | 1/2020 | Li | ............ | H04W 36/14 |
| 10,743,218 B2* | 8/2020 | Ding | ............ | H04W 36/0016 |
| 10,834,626 B2* | 11/2020 | Youn | ............ | H04W 28/06 |
| 2014/0192711 A1 | 7/2014 | Tang et al. | | |
| 2016/0352546 A1 | 12/2016 | Zhao et al. | | |

(Continued)

FOREIGN PATENT DOCUMENTS

| CN | 102611537 A | 7/2012 |
|---|---|---|
| CN | 103326832 A | 9/2013 |

(Continued)

OTHER PUBLICATIONS

"3rd Generation Partnership Project; Technical Specification Group Services and System Aspects; System Architecture for the 5G System; Stage 2 (Release 15)", 3GPP Standard; Technical Specification; 3GPP TS 23.501, vol. SA WG2, No. V0.3.1, Mar. 6, 2017 (Mar. 6, 2017), pp. 1-97, XP051290363.

(Continued)

*Primary Examiner* — Tri H Phan
(74) *Attorney, Agent, or Firm* — Womble Bond Dickinson (US) LLP

(57) ABSTRACT

A data processing method, a terminal device, and a network device are provided, to provide a processing manner of an application data packet in a fourth mode. In this application, the terminal device first obtains the first information. The first information includes the processing manner of the application data packet in the fourth mode. Therefore, the terminal device knows how to process the data packet in the fourth mode, and further processes the terminal device in the determined processing manner.

18 Claims, 14 Drawing Sheets

(56) References Cited

U.S. PATENT DOCUMENTS

| | | | | |
|---|---|---|---|---|
| 2019/0289506 A1* | 9/2019 | Park | ................. | H04W 76/27 |
| 2020/0053803 A1* | 2/2020 | Youn | ................. | H04W 76/10 |
| 2021/0100047 A1* | 4/2021 | Chiba | ............. | H04W 28/0252 |
| 2021/0136840 A1* | 5/2021 | Kawasaki | ............. | G16Y 10/75 |

FOREIGN PATENT DOCUMENTS

| | | | | |
|---|---|---|---|---|
| CN | 104272674 A | 1/2015 | | |
| CN | 106211019 A | 12/2016 | | |
| CN | 106537987 A | 3/2017 | | |
| EP | 2670077 A1 | 12/2013 | | |
| WO | WO-2018066799 A1 * | 4/2018 | ............ | H04W 76/10 |

OTHER PUBLICATIONS

Anonymous: "3rd Generation Partnership Project; Technical Specification Group Services and System Aspects; Study on Architecture for Next Generation System (Release 14)", 3GPP TR 23.799 V14.0.0, Dec. 16, 2016 (Dec. 16, 2016), pp. 1-522, XP055560644.

\* cited by examiner

DATA PROCESSING METHOD, TERMINAL DEVICE, AND NETWORK DEVICE

CROSS-REFERENCE TO RELATED APPLICATIONS

This application is a continuation of International Application No. PCT/CN2017/083668, filed on May 9, 2017, the disclosure of which is hereby incorporated by reference in its entirety.

TECHNICAL FIELD

This application relates to the field of wireless communications technologies, and in particular, to a data processing method, a terminal device, and a network device in a wireless communications system.

BACKGROUND

FIG. 1A shows a 5th-generation (5G) network architecture. To enable user equipment (UE) to transmit application data, a mobile communications network establishes packet data unit (PDU) sessions for the UE, and the PDU sessions provide a PDU connection service between the UE and a data network (DN). Each PDU session includes at least one user plane function (UPF) device. As shown in FIG. 1A, there are three PDU sessions in a current DN. The three PDU sessions are a PDU session 1, a PDU session 2, and a PDU session 3. Each PDU session corresponds to one UPF device. The UPF device is referred to as an Internet protocol (IP) anchor of the PDU session, and each PDU session corresponds to one session and service continuity mode. There are three session and service continuity modes: a first mode, a second mode, and a third mode. PDU sessions in different session and service continuity modes may be used to transmit application data packets in the corresponding modes. As shown in FIG. 1A, the PDU session 1 corresponds to the second mode, and is used to transmit an application or an application data packet in the second mode; the PDU session 2 corresponds to the first mode, and is used to transmit an application or an application data packet in the first mode; the PDU session 3 corresponds to the third mode, and is used to transmit an application or an application data packet in the third mode. For a same DN, there is a maximum of one session in each mode. For example, for FIG. 1A, because the sessions in all the three modes have been established, for the DN, a PDU session in the first mode (or the second mode, or the third mode) cannot be established any more.

In the architecture shown in FIG. 1A, each PDU session can be used to transmit an application in only one mode. Currently, another 5G architecture is further provided. As shown in FIG. 2A, after a PDU session for transmitting an application data packet in the first mode is successfully established, in some cases, the PDU session may be further used to transmit an application data packet in the second mode. The PDU session in FIG. 2A includes three UPF devices: an uplink classifier functionality (UL CL) device, a PDU session IP anchor 1, and a PDU session IP anchor 2. The UL CL device is used to determine whether application data packets in a same PDU session are routed to a DN through the PDU session IP anchor 1 or routed to a DN (a local network) through the PDU session IP anchor 2.

There are a plurality of applications, for example, a Taobao application and a Jingdong application, in one DN, and the applications may have corresponding session and service continuity modes. Therefore, for application data in the second mode, there may be two PDU sessions that can be used to transmit the application data packet. How a terminal device determines the PDU sessions for transmitting the application data packet in the second mode is uncertain. In addition, how to process an application in no session and service continuity mode and data packets of some applications supporting a local service are also unclear.

In conclusion, there is still no corresponding solution currently to a processing manner of an application data packet on a PDU session.

SUMMARY

This application provides a data processing method, a terminal device, and a network device, to provide a processing manner of an application data packet on a PDU session.

According to a first aspect, this application provides a data processing method, including: obtaining, by a terminal device, first information, where the first information is used to determine a processing manner of an application data packet in a fourth mode, and the processing manner is transmitting the application data packet in the fourth mode through a packet data unit PDU session for transmitting an application data packet in a first mode, or transmitting the application data packet in the fourth mode through a PDU session for transmitting only the application data packet in the fourth mode; and processing, by the terminal device, the application data packet in the fourth mode in the processing manner.

In this application, the terminal device obtains the first information. The first information is used to determine the processing manner of the application data packet in the fourth mode. The terminal device processes the data packet in the fourth mode in the processing manner. The processing manner is transmitting the application data packet in the fourth mode through the PDU session for transmitting the application data packet in the first mode, or transmitting the application data packet in the fourth mode through the PDU session for transmitting only the application data packet in the mode. In this application, the terminal device first obtains the first information. The first information includes the processing manner of the application data packet in the fourth mode. Therefore, the terminal device knows how to process the data packet in the fourth mode, and further processes the terminal device in the determined processing manner. In one embodiment, the application data packet in the fourth mode is at least one of the following: an application data packet in a second mode, an application data packet having no mode information, and an application data packet supporting a local access network.

In one embodiment, the obtaining, by a terminal device, first information includes: receiving, by the terminal device, the first information sent by a network device. To be specific, the terminal device obtains the first information from a network device side, and the first information indicates the processing manner of the application data packet in the fourth mode. In one embodiment, the first information indicates the processing manner or network information. When the first information indicates the processing manner, an indication manner is explicit, and the first information explicitly indicates the processing manner. When the first information indicates the network information, an indication manner is implicit, and the terminal may determine, by using different content of the network information, the processing manner corresponding to the network device, in other words, the first information implicitly indicates the processing manner. In one embodiment, the first information may be further PDU session information. The PDU session information includes PDU session identification information and session and service continuity mode information of an application data packet that can be transmitted on a PDU session. To be specific, the terminal device obtains, from the network device, the PDU session identification information identifying an available PDU session, and obtains the session and service continuity mode information of the application data packet that can be transmitted on the PDU session, so that the terminal device can determine the processing manner based on the session and service continuity mode information of the application data packet that can be transmitted on the PDU session. For example, when the session and service continuity mode information of the application data packet that can be transmitted on the PDU session is supporting transmission of only the application data packet in the fourth mode, the application data packet in the fourth mode is transmitted on the PDU session in this manner. When the session and service continuity mode information of the application data packet that can be transmitted on the PDU session is that both the application data packet in the first mode and the data packet in the fourth mode can be transmitted, the application data packet in the fourth mode is transmitted on the PDU session in this manner.

In another embodiment, the obtaining, by a terminal device, first information includes: obtaining, by the terminal device, the first information preconfigured by the terminal device. To be specific, the terminal device stores the first information, and the first information indicates the processing manner of the application data packet in the fourth mode, so that the terminal can process the application data packet in the fourth mode in the processing manner indicated by the first information.

In one embodiment, when the processing manner is transmitting the application data packet in the fourth mode through the PDU session for transmitting only the application data packet in the fourth mode, the processing, by the terminal device, the application data packet in the fourth mode in the processing manner includes: determining, by the terminal device, the PDU session in the fourth mode, and transmitting the application data packet in the fourth mode on the PDU session.

In one embodiment, when the processing manner is transmitting the application data packet in the fourth mode through the PDU session for transmitting only the application data packet in the fourth mode, the processing, by the terminal device, the application data packet in the fourth mode in the processing manner includes: triggering, by the terminal device, establishment of the PDU session in the fourth mode, and transmitting the application data packet in the fourth mode on the PDU session.

In one embodiment, when the processing manner is transmitting the application data packet in the fourth mode through the PDU session for transmitting the application data packet in the first mode, the processing, by the terminal device, the application data packet in the fourth mode in the processing manner includes: determining, by the terminal device, the PDU session in the first mode, and transmitting the application data packet in the fourth mode on the PDU session.

In one embodiment, when the processing manner is transmitting the application data packet in the fourth mode through the PDU session for transmitting the application data packet in the first mode, the processing, by the terminal device, the application data packet in the fourth mode in the processing manner includes: triggering, by the terminal device, establishment of the PDU session in the first mode, and transmitting the application data packet in the fourth mode on the PDU session.

In one embodiment, the first mode is a session and service continuity mode SSC mode 1, and the second mode is an SSC mode 2.

According to a second aspect, an embodiment of this application provides a terminal device, to perform and implement any method according to the first aspect.

In one embodiment, the terminal device has a function of implementing behavior of the terminal device in any method in the first aspect. The function may be implemented by using hardware, or may be implemented by hardware executing corresponding software. The hardware or the software includes one or more modules corresponding to the foregoing function. In one embodiment, the terminal device may be user equipment. The terminal device may be configured to obtain first information, where the first information is used to determine a processing manner of an application data packet in a fourth mode; and process the data packet in the fourth mode in the processing manner. The processing manner is transmitting the application data packet in the fourth mode through a PDU session for transmitting an application data packet in a first mode, or transmitting the application data packet in the fourth mode through a PDU session for transmitting only the application data packet in the mode. In this application, the terminal device first obtains the first information. The first information includes the processing manner of the application data packet in the fourth mode. Therefore, the terminal device knows how to process the data packet in the fourth mode, and further processes the terminal device in the determined processing manner. In one embodiment, the application data packet in the fourth mode is at least one of the following: an application data packet in a second mode, an application data packet having no mode information, and an application data packet supporting a local access network.

In one embodiment, a structure of the terminal device includes a processor and a transceiver. The processor is configured to support the terminal device in performing a corresponding function in any method in the first aspect, for example, generating, receiving, or processing data and/or information in the method. The transceiver is configured to support communication between the terminal device and another entity, and send or receive information or an instruction in any method in the first aspect to or from the another entity. The terminal device may further include a memory. The memory is configured to couple to the processor. The memory stores a program instruction and data that are necessary for the terminal device.

According to a first aspect, this application provides a data processing method, including: sending, by a network device, first information to a terminal device, so that the terminal device processes an application data packet in a fourth mode in a processing manner indicated by the first information, where the processing manner is transmitting the application data packet in the fourth mode through a PDU session for transmitting an application data packet in a first mode, or transmitting the application data packet in the fourth mode through a PDU session for transmitting only the application data packet in the fourth mode.

In this application, the network device sends the first information to the terminal device, to indicate the processing manner of the application data packet in the fourth mode. The terminal device processes the data packet in the fourth mode in the processing manner. The processing manner is transmitting the application data packet in the fourth mode through the PDU session for transmitting the application data packet in the first mode, or transmitting the application data packet in the fourth mode through the PDU session for transmitting only the application data packet in the mode. In this application, the network device indicates the processing manner of the application data packet in the fourth mode to the terminal device, so that the terminal device knows how to process the data packet in the fourth mode. In one embodiment, the application data packet in the fourth mode includes at least one of the following: an application data packet in a second mode, an application data packet having no mode information, and an application data packet supporting a local access network.

In one embodiment, the first information indicates the processing manner or network information. When the first information indicates the processing manner, an indication manner is explicit, and the first information explicitly indicates the processing manner. When the first information indicates the network information, an indication manner is implicit, and the terminal may determine, by using different content of the network information, the processing manner corresponding to the network device, in other words, the first information implicitly indicates the processing manner.

In one embodiment, the first information may be further PDU session information. The PDU session information includes PDU session identification information and session and service continuity mode information of an application data packet that can be transmitted on a PDU session. To be specific, the terminal device obtains, from the network device, the PDU session identification information identifying an available PDU session, and obtains the session and service continuity mode information of the application data packet that can be transmitted on the PDU session, so that the terminal device can determine the processing manner based on the session and service continuity mode information of the application data packet that can be transmitted on the PDU session. For example, when the session and service continuity mode information of the application data packet that can be transmitted on the PDU session is supporting transmission of only the application data packet in the fourth mode, the application data packet in the fourth mode is transmitted on the PDU session in this manner. When the session and service continuity mode information of the application data packet that can be transmitted on the PDU session is that both the application data packet in the first mode and the data packet in the fourth mode can be transmitted, the application data packet in the fourth mode is transmitted on the PDU session in this manner.

In one embodiment, the first mode is an SSC mode 1, and the second mode is an SSC mode 2.

According to a fourth aspect, an embodiment of this application provides a network device, to implement any method according to the third aspect.

In one embodiment, the network device has a function of implementing behavior of the network device in any method in the third aspect. The function may be implemented by using hardware, or may be implemented by hardware executing corresponding software. The hardware or the software includes one or more modules corresponding to the foregoing function. The network device may be configured to send first information to a terminal device, to indicate a processing manner of an application data packet in a fourth mode. The terminal device processes the data packet in the fourth mode in the processing manner. The processing manner is transmitting the application data packet in the fourth mode through a PDU session for transmitting an application data packet in a first mode, or transmitting the application data packet in the fourth mode through a PDU session for transmitting only the application data packet in the mode. In this application, the network device indicates the processing manner, of the application data packet in the fourth mode to the terminal device, so that the terminal device knows how to process the data packet in the fourth mode. In one embodiment, the application data packet in the fourth mode includes at least one of the following: an application data packet in a second mode, an application data packet having no mode information, and an application data packet supporting a local access network.

In one embodiment, a structure of the network device includes a processor and a transceiver. The processor is configured to support the network device in performing a corresponding function in any method in the third aspect, for example, generating, receiving, or processing data and/or information in the method. The transceiver is configured to support communication between the network device and another entity, and send or receive information or an instruction in any method in the third aspect to or from the another entity. The network device may further include a memory. The memory is configured to couple to the processor. The memory stores a program instruction and data that are necessary for the network device.

According to a fifth aspect, this application provides a data processing method, including: receiving, by an SMF device, a data flow event reported by a first user plane function UPF device, where the data flow event is generated by the first UPF device after the first UPF device receives, on a PDU session for transmitting an application data packet in a first mode, an application data packet in a fourth mode that is sent by a terminal device, and the application data packet in the fourth mode is an application data packet in a second mode, an application data packet having no mode information, or an application data packet supporting a local access network; and connecting, by the SMF device based on the data flow event, an uplink classifier functionality UL CL device and a second UPF device to the PDU session if a data flow corresponding to the data flow event needs to be locally routed, so that the application data packet in the fourth mode that is sent by the terminal is distributed by the UL CL device to the second UPF device.

In this application, after receiving the data flow event reported by the first UPF device, the SMF device connects the UL CL device and the second UPF device to the PDU session based on the data flow event, and the UL CL device and the second UPF device are configured to transmit the application data packet in the fourth mode, so that the application data packet in the fourth mode can be transmitted on the PDU session in the first mode.

In one embodiment, the first mode is an SSC mode 1, and the second mode is an SSC mode 2.

According to a sixth aspect, an embodiment of this application provides an SMF device, to perform and implement the method according to the fifth aspect.

In one embodiment, the network device has a function of implementing behavior of the SMF device in the method in the fifth aspect. The function may be implemented by using hardware, or may be implemented by hardware executing corresponding software. The hardware or the software includes one or more modules corresponding to the foregoing function. The SMF device may be configured to: after receiving a data flow event reported by a first UPF device, connect a UL CL device and a second UPF device to a PDU session based on the data flow even. The UL CL device and the second UPF device are configured to transmit an application data packet in a fourth mode, so that the application data packet in the fourth mode can be transmitted on a PDU session in a first mode.

In one embodiment, a structure of the SMF device includes a processor and a transceiver. The processor is configured to support the network device in performing a corresponding function in the method in the fifth aspect, for example, generating, receiving, or processing data and/or information in the method. The transceiver is configured to support communication between the SMF device and another entity, and send or receive information or an instruction in the method in the fifth aspect to or from the another entity. The SMF device may further include a memory. The memory is configured to couple to the processor. The memory stores a program instruction and data that are necessary for the SMF device.

According to a seventh aspect, an embodiment of this application provides a computer storage medium, configured to store a computer software instruction used by the terminal device according to the second aspect. The computer software instruction includes a program designed for performing the first aspect.

According to an eighth aspect, an embodiment of this application provides a computer storage medium, configured to store a computer software instruction used by the network device according to the fourth aspect. The computer software instruction includes a program designed for performing the third aspect.

According to a ninth aspect, an embodiment of this application provides a computer storage medium, configured to store a computer software instruction used by the SMF device according to the sixth aspect. The computer software instruction includes a program designed for performing the fifth aspect.

According to a tenth aspect, this application further provides a computer program product including an instruction. When the computer program product is run on a computer, the computer is enabled to perform the method according to the first aspect. The computer program product includes a computer executable instruction. The computer executable instruction is stored in a computer-readable storage medium. A processor of a terminal device may read the computer executable instruction from the computer-readable storage medium. The processor executes the computer executable instruction, so that the terminal device performs the operations performed by the terminal device in the foregoing method provided in the embodiments of this application, or functional units corresponding to the operations are deployed for the terminal device.

According to an eleventh aspect, this application further provides a computer program product including an instruction. When the computer program product is run on a computer, the computer is enabled to perform the method according to the third aspect. The computer program product includes a computer executable instruction. The computer executable instruction is stored in a computer-readable storage medium. A processor of a network device may read the computer executable instruction from the computer-readable storage medium. The processor executes the computer executable instruction, so that the network device performs the operations performed by the network device in the foregoing method provided in the embodiments of this application, or functional units corresponding to the operations are deployed for the network device.

According to a twelfth aspect, this application further provides a computer program product including an instruction. When the computer program product is run on a computer, the computer is enabled to perform the method according to the fifth aspect. The computer program product includes a computer executable instruction. The computer executable instruction is stored in a computer-readable storage medium. A processor of a SMF device may read the computer executable instruction from the computer-readable storage medium. The processor executes the computer executable instruction, so that the SMF device performs the operations performed by the SMF device in the foregoing method provided in the embodiments of this application, or functional units corresponding to the operations are deployed for the SMF device.

According to a thirteenth aspect, this application further provides a chip system. The chip system includes a processor, configured to support a terminal device in implementing a function in the first aspect, for example, generating, receiving, or processing data and/or information in the foregoing method. In one embodiment, the chip system further includes a memory. The memory is configured to store a program instruction and data that are necessary for the terminal device. The chip system may include a chip, or may include a chip and another discrete device.

According to a fourteenth aspect, this application further provides a chip system. The chip system includes a processor, configured to support a network device in implementing a function in the third aspect, for example, generating, receiving, or processing data and/or information in the foregoing method. In one embodiment, the chip system further includes a memory. The memory is configured to store a program instruction and data that are necessary for the network device. The chip system may include a chip, or may include a chip and another discrete device.

According to a fifteenth aspect, this application further provides a chip system. The chip system includes a processor, configured to support an SMF device in implementing a function in the fifth aspect, for example, generating, receiving, or processing data and/or information in the foregoing method. In one embodiment, the chip system further includes a memory. The memory is configured to store a program instruction and data that are necessary for a network device. The chip system may include a chip, or may include a chip and another discrete device.

DESCRIPTION OF EMBODIMENTS

The following clearly describes the technical solutions in the embodiments of this application with reference to the accompanying drawings in the embodiments of this application.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

This application may be applied to an existing cellular communications system, such as a global system for mobile communications (GSM) system, a wideband code division multiple access (WCDMA) system, or a long term evolution (LTE) system, is applicable to a 5th-generation (5G) system, such as a communications system using a new radio (NR) access network or a cloud radio access network (CRAN), or may be extended to a similar wireless communications system, such as a wireless-fidelity (Wi-Fi) system, a worldwide interoperability for microwave access (WiMAX) system, a 3rd generation partnership project (3GPP) system, and another related cellular system, is also applicable to another wireless communications system that uses an orthogonal frequency division multiplexing (OFDM) access technology, and is further applicable to a future wireless communications system.

The network architecture and the service scenario described in this application are intended to describe the technical solutions in this application more clearly, and do not constitute a limitation on the technical solutions provided in this application. A person of ordinary skill in the art may know that with the evolution of the network architecture and the emergence of the new service scenarios, the technical solutions provided in this application are also applicable to the similar technical problems.

Figure 3:
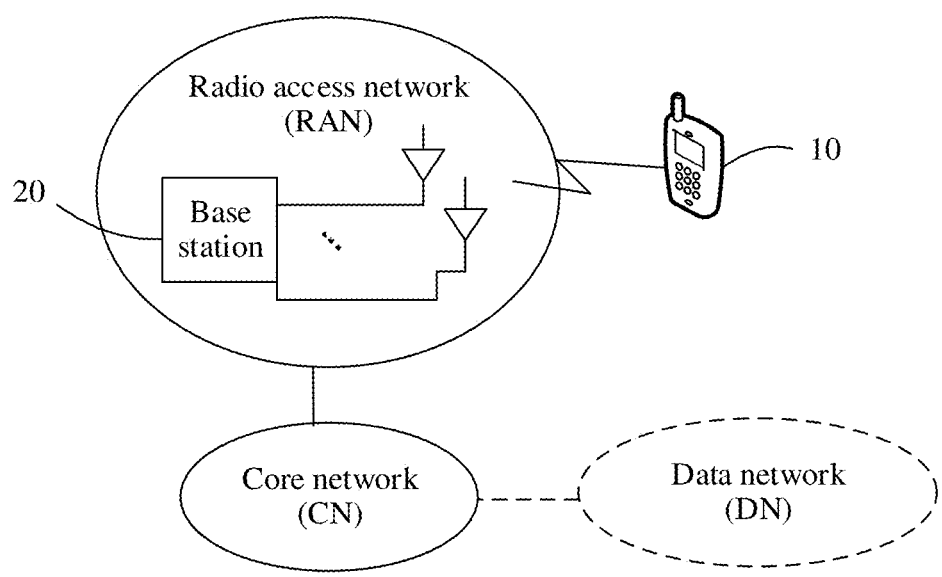
FIG. 3 is a schematic diagram of an application scenario according to this application.

FIG. 3 is a schematic diagram of an example scenario according to this application. The application scenario includes at least one terminal device 10 that communicates with a radio access network (RAN) through a radio interface. The RAN includes at least one base station 20. For clarity, only one base station and one terminal device are shown in the figure. The terminal device 10 may further communicate with another terminal device 10. For example, the communication may be communication in a device-to-device (D2D) or machine-to-machine (M2M) scenario. The base station may communicate with the terminal device 10, or may communicate with another base station. For example, the communication may be communication between a macro base station and an access point. The RAN is connected to a core network (CN). In one embodiment, the CN may be coupled to one or more data networks (DN), such as the Internet and a public switched telephone network (PSTN).

In this application, nouns "network" and "system" are usually interchangeably used, but meanings of the nouns may be understood by a person skilled in the art.

To facilitate understanding, the following describes some device names in this application.

(1) A terminal device includes user equipment (UE), a terminal, and the like, and is a device providing voice and/or data connectivity to a user, for example, a handheld device, a vehicle-mounted device, a wearable device, a computing device, or a control device that has a wireless connection function or a wireless communication function, or another processing device connected to a wireless modem, and mobile stations (MS) in various forms. Common terminal devices include a mobile phone, a tablet computer (pad), a notebook, a palmtop computer, a mobile internet device (MID), and a wearable device such as a smartwatch, a smart band, or a pedometer. For ease of description, in this application, the devices mentioned above are collectively referred to as the terminal device.

It should be noted that, for ease of description, "terminal device" and "UE" are alternately used subsequently in this application, and both mean the terminal device.

(2) A base station, also referred to as a RAN device, is a device that connects the terminal device to a wireless network, and includes but is not limited to: an evolved NodeB (eNB), a radio network controller (RNC), a NodeB (NB), a base station controller (BSC), and a base transceiver station (BTS), a home eNodeB (HNB), a baseband unit (BBU), a gNodeB (gNB), a transmitting and receiving point (TRP), a transmitting point (TP), a mobile switching center, and the like. In addition, the base station may further include a Wi-Fi access point (AP) and the like, and further includes a macro base station, a micro base station, a relay node, an access point, a remote radio unit (RRU), or the like in various forms. In different systems, a device having a function of the base station may have different names. For example, in an LTE network, the device is referred to as an evolved NodeB (eNodeB), and in a 3rd generation (3G) network, the device is referred to as a NodeB.

(3) A network device in this application refers to a network element in a core network, for example, a network element having an access and mobility management function, a network element having a session management function, and a user plane function device.

The network element having the session management function may be, for example, a session management function (SMF) device. The SMF device is responsible for session management, IP address allocation and management for the UE, and UP anchor function allocation and selection, and is responsible for selection and reselection of a UPF and a user plane path, and the like.

The network element having the access and mobility management function may be, for example, an access and mobility management function (AMF) device. The AMF device is responsible for access and mobility management, completes registration management, connection management, reachability management, mobility management, and the like, and transparently routes a session management message to the SMF device.

The user plane function device is, for example, a UPF.

In this application, in different application scenarios, the network device refers to different physical devices. In some application scenarios, the network device refers to the network element (for example, the SMF device) having the session management function. In other application scenarios, the network device refers to the network element (for example, the AMF device) having the access and mobility management function. A description and an explanation are provided in a specific application scenario.

It should be noted that, in this application, an application may also be understood as application data, an application data flow, an application data packet, data, a data packet, or a data flow, and they have a same meaning. In this application, "an application data packet in a fourth mode" has a same meaning with "a data packet in a fourth mode", "application data in a fourth mode", "an application data packet in a fourth mode", and "an application in a fourth mode" when being mentioned. They specifically indicate that an application in a fourth mode is transmitted from the terminal device to a DN in a form of a data packet. Therefore, the application in the fourth mode may also be understood as the application data packet or a data flow (where one data flow includes a plurality of data packets) in the fourth mode.

Currently, there are mainly three modes corresponding to a PDU session: a first mode, a second mode, and a third mode. The first mode is specifically a session and service continuity (SSC) mode 1, the second mode is specifically an SSC mode 2, and the third mode is specifically an SSC mode 3. Specifically, the UE establishes a PDU session with the DN by using the UPF device, and the PDU session provides a PDU connection service between the UE and the DN.

There are three modes: the SSC mode 1, the SSC mode 2, and the SSC mode 3.

SSC mode 1 (namely, first mode): After a PDU session in the SSC mode 1 is established, when the UE moves to any region or within any access technology, a UPF device in the PDU session serves the UE as an anchor. In other words, the PDU session is not interrupted in any form due to movement of the UE, and an IP connection of the session is always supported.

SSC mode 2 (namely, second mode): After a PDU session in the SSC mode 2 is established, when the UE moves, if the UE leaves a service area of a UPF device, a network may select a new UPF device for the UE, to establish a PDU session for the UE, release the PDU session established by using the old UPF device, and instructs the UE to establish a connection to a same DN through the PDU session established by using the new UPF device. In such a mode, a UPF may be considered as having a specific service area. When the UE moves in the service area, the UPF serves the UE. However, if the UE leaves the service area, the UPF cannot serve the UE, and a session originally established by using the UPF is to be interrupted.

SSC mode 3 (namely, third mode): After a PDU session in the SSC mode 3 is established, in the session in this mode, a service area of a UPF also has a range. However, a difference from the SSC mode 2 is that after the UE leaves the service area of the UPF, a network selects a new UPF to serve the UE, and the UE establishes a new PDU session with an original DN by using the new UPF, but the old PDU session established by the UE by using the old UPF may not be released temporarily but may be released after the new PDU session is established.

An application also has a corresponding mode. An application, for example, a Taobao application or a Jingdong application, in a DN establishes a communication link to an application server of the application in the DN through a PDU session. A corresponding PDU session is selected for application data based on a corresponding mode of the application data. Specifically, applications also correspond to the foregoing three modes, and one application usually establishes a communications connection to the DN through a PDU session in a same mode. In other words, if a mode of an application is the first mode, when the UE moves, a UPF device in a PDU session established for data transmission of the application does not change due to a change of a location of the UE, access information, and the like. From a perspective of data packet transmission of the application, the data transmission of the application does not change due to movement of the UE. If a mode of an application is the second mode, when the UE moves, a UPF device in a PDU session established for data transmission of the application may change, for example, may be reselected, due to a change of location information of the UE. From a perspective of data packet transmission of the application, the data transmission of the application may change due to movement of the UE. If a mode of an application is the third mode, when the UE moves, a UPF device in a PDU session established for data transmission of the application may change, for example, may be reselected, due to a change of location information of the UE. However, a difference from the second mode is that the UPF device in the PDU session for transmitting the data packet of the application temporarily continues to serve the UE, and the UPF device is reselected after a period of time, for example, after transmission of the data packet of the application ends. In other words, the UPF device does not immediately change due to a change of a location of the UE.

For example, currently, three modes respectively corresponding to applications, namely, an APP 1, an APP 2, an APP 3, and an APP 4 in the DN are the SSC mode 1, the SSC mode 2, the SSC mode 2, and the SSC mode 3, as shown in Table 1.

TABLE 1

Table of a correspondence between applications and modes

| Application | Mode |
| --- | --- |
| APP 1 | First mode |
| APP 2 | Second mode |
| APP 3 | Second mode |
| APP 4 | Third mode |
| . . . | . . . |

It should be noted that the correspondence may be a direct correspondence between the applications and the modes, or an indirect correspondence established by using other information. For example, all applications in a DN correspond to a mode. Therefore, provided that a DN to which an application belongs is determined, a mode corresponding to the application can be determined.

Manners of obtaining, by the terminal, mode information corresponding to an application include but are not limited to the following several manners.

Manner 1: A network side device (for example, the SMF device, the AMF device, or the UPF device) sends the correspondence to the UE, or sends the correspondence to the UE in a network management manner. For example, a terminal in a network is managed by using a remote server in a manner of open mobile alliance (OMA) device management (DM), to notify the UE of the correspondence between the application and the mode.

Manner 2: An operator writes the correspondence into a chip, for example, into a universal subscriber identity module (USIM).

When the terminal needs to perform a service of an application, the terminal selects a PDU session that has a same mode as that of the application, to transmit a data packet of the application.

Figure 1A:
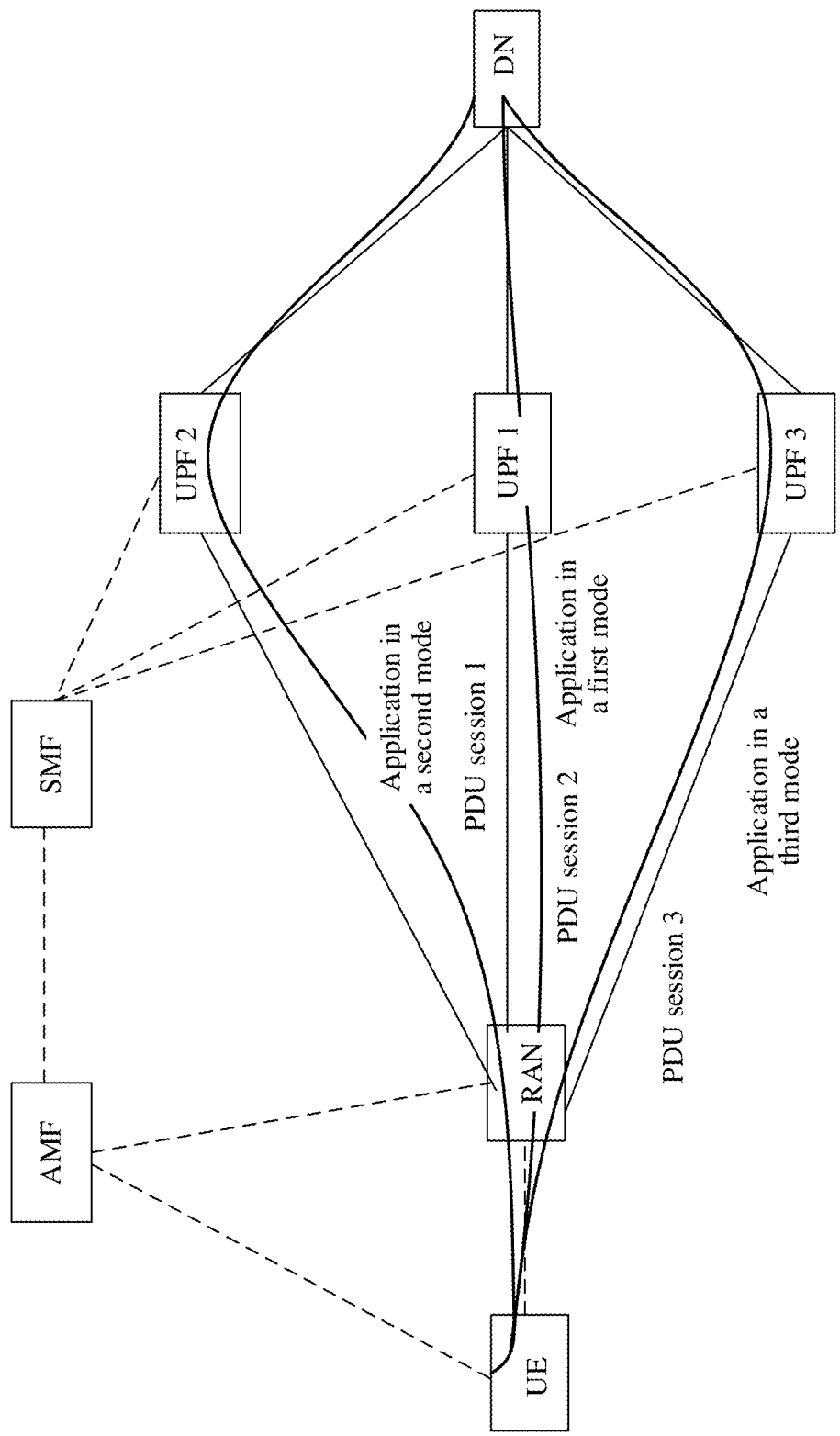
FIG. 1A is a diagram of a 5G system architecture according to this application.

FIG. 1A is used as an example. Assuming that the terminal device needs to transmit a data packet of the application APP 2 to an application server in the DN, the terminal device selects an established PDU session 1 (which is established by using a UPF 2) in the second mode, to transmit the application data packet of the APP 2 to the DN. If there is no PDU session in the second mode in FIG. 1A, a PDU session in the second mode is established, and the data packet of the application APP 2 is transmitted on the established PDU session.

This application proposes a concept of a feature of the fourth mode. It should be noted that "fourth mode" herein is merely used to describe a feature of data transmission of an application and a feature of service continuity of a PDU session, is merely a name, and may be another name. A feature of data transmission of an application in the fourth mode and a feature of service continuity of a PDU session in the fourth mode are described as follows:

1. When a mode corresponding to an application is the fourth mode, it means that when a data packet of the application is transmitted, a UPF function device that processes the data packet of the application has a service area, and when the UE moves, if the UE leaves the service area, the UPF function device that processes the data packet of the application may need to be reselected. From a perspective of the feature of the fourth mode, an application corresponding to the second mode may also be considered to correspond to the fourth mode. If applications do not have corresponding application modes, to be specific, the terminal does not know the application modes corresponding to the applications, in this case, it may be considered that the application modes corresponding to the applications are the fourth mode, or the applications support local access, belong to a local access network, or may be considered to belong to the fourth mode.

2. When a PDU session corresponds to the fourth mode, it means that when the UE moves, at least one UPF function device in the PDU session is reselected.

For example, based on Table 1, applications, namely, an APP 5, an APP 6, and an APP 7, that are all in the fourth mode are added, referring to Table 2.

TABLE 2

Table of a correspondence between applications and modes

| Application | Mode |
|---|---|
| APP 1 | First mode |
| APP 2 | Second mode (fourth mode) |
| APP 3 | Second mode (fourth mode) |
| APP 4 | Third mode |

TABLE 2-continued

Table of a correspondence between applications and modes

| Application | Mode |
|---|---|
| APP 5 | Second mode (fourth mode) |
| APP 6 | /(fourth mode) |
| APP 7 | Supporting a local access network (fourth mode) |
| ... | ... |

In Table 2, the second mode, having no mode information (indicated by "I"), and supporting the local access network each are one type of the fourth mode.

Figure 2A:
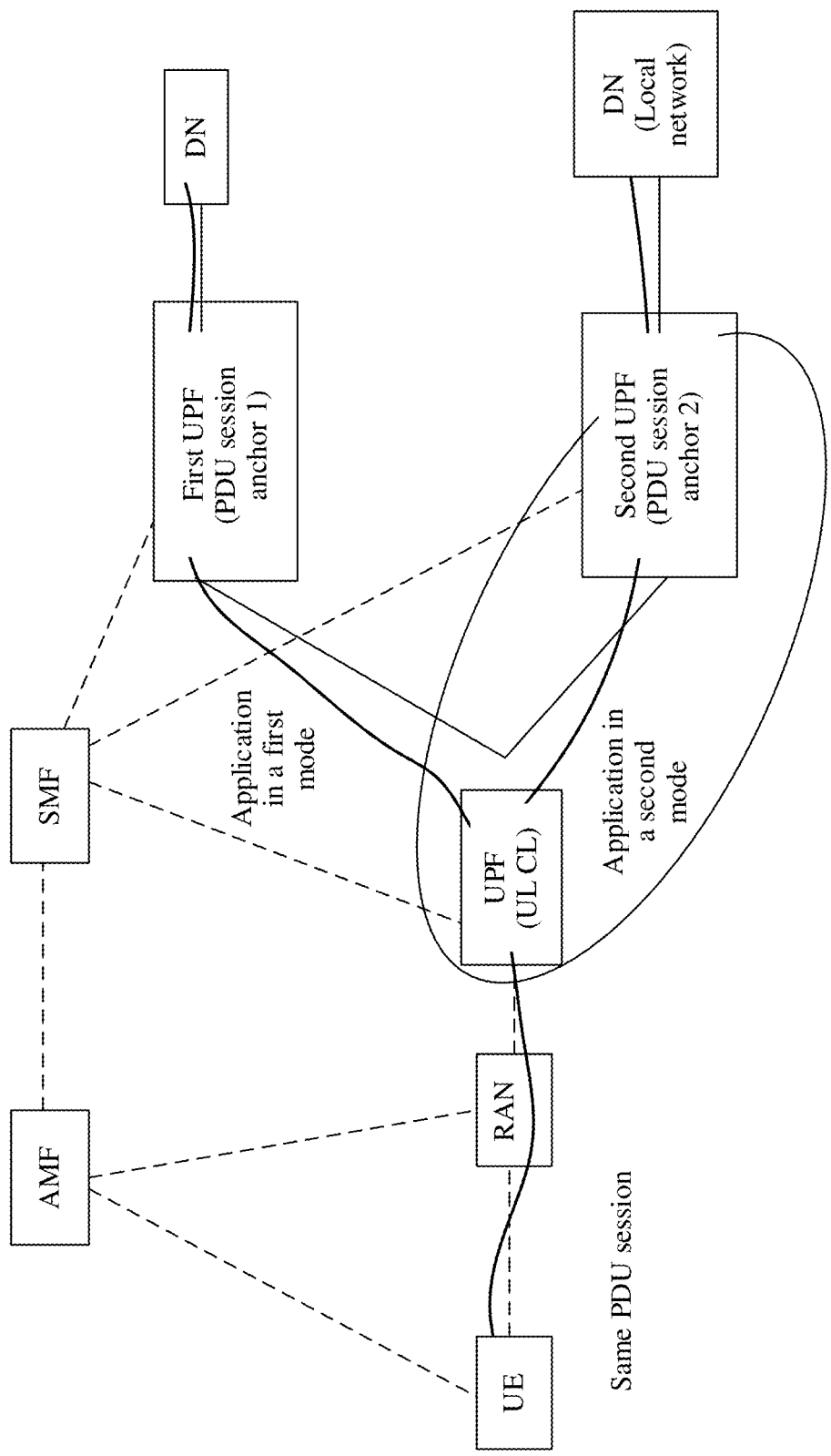
FIG. 2A is a diagram of another 5G system architecture according to this application.
Figure 4A:
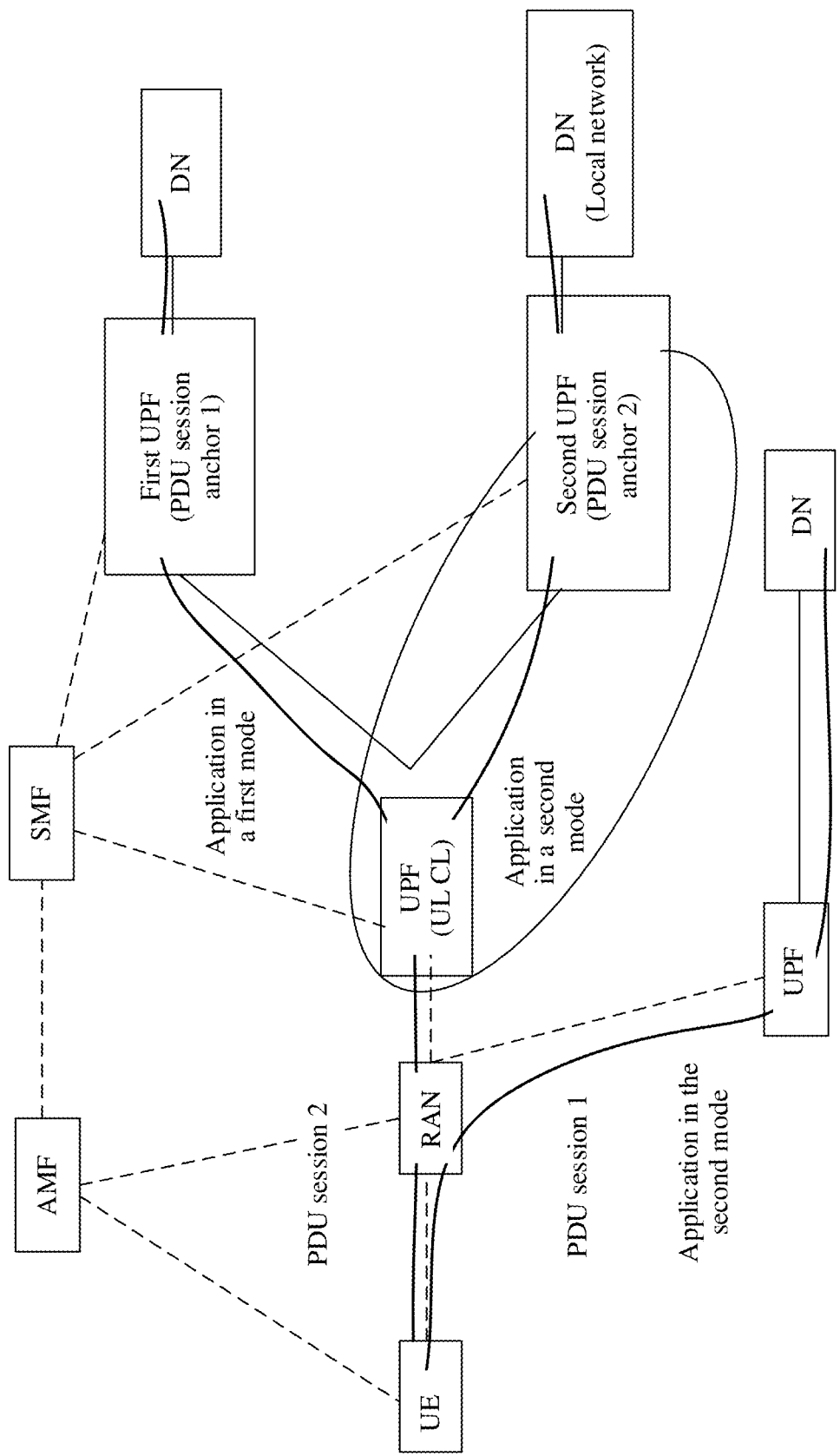
FIG. 4A is a diagram of another 5G system architecture according to this application.

Currently, as shown in FIG. 1A, an application data packet in the second mode may be transmitted to an application server in the DN through a PDU session for transmitting only the application data packet in the second mode. Herein, "a PDU session for transmitting only the application data packet in the second mode" means that session and service continuity features of application data packets transmitted on the PDU session are all the second mode. Alternatively, as shown in FIG. 2A, an application data packet in the second mode may be transmitted to an application server in the DN through a PDU session for transmitting an application data packet in the first mode. In other words, an application in the second mode may be transmitted on a PDU session for transmitting an application in the first mode. Alternatively, an application data packet in the second mode may be transmitted by using a 5G system architecture shown in FIG. 4A. There are two manners of transmitting the application data packet in the second mode. Both the two manners may be used. One manner is transmission on the PDU session for transmitting the application data packet in the first mode, and the other manner is transmission on the PDU session for transmitting only the application data packet in the second mode.

Figure 1B:
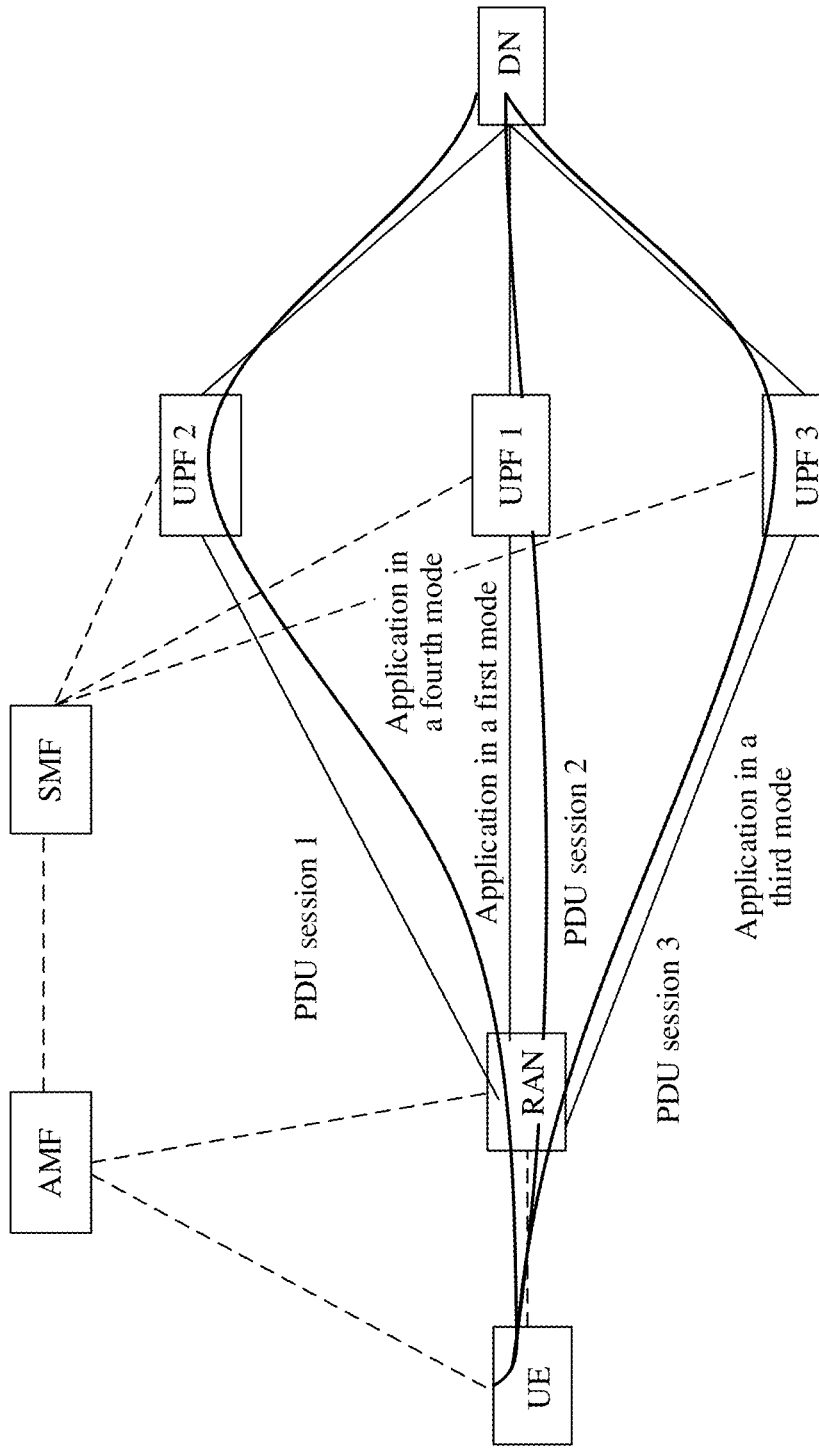
FIG. 1B is a diagram of another 5G system architecture according to this application.
Figure 2B:
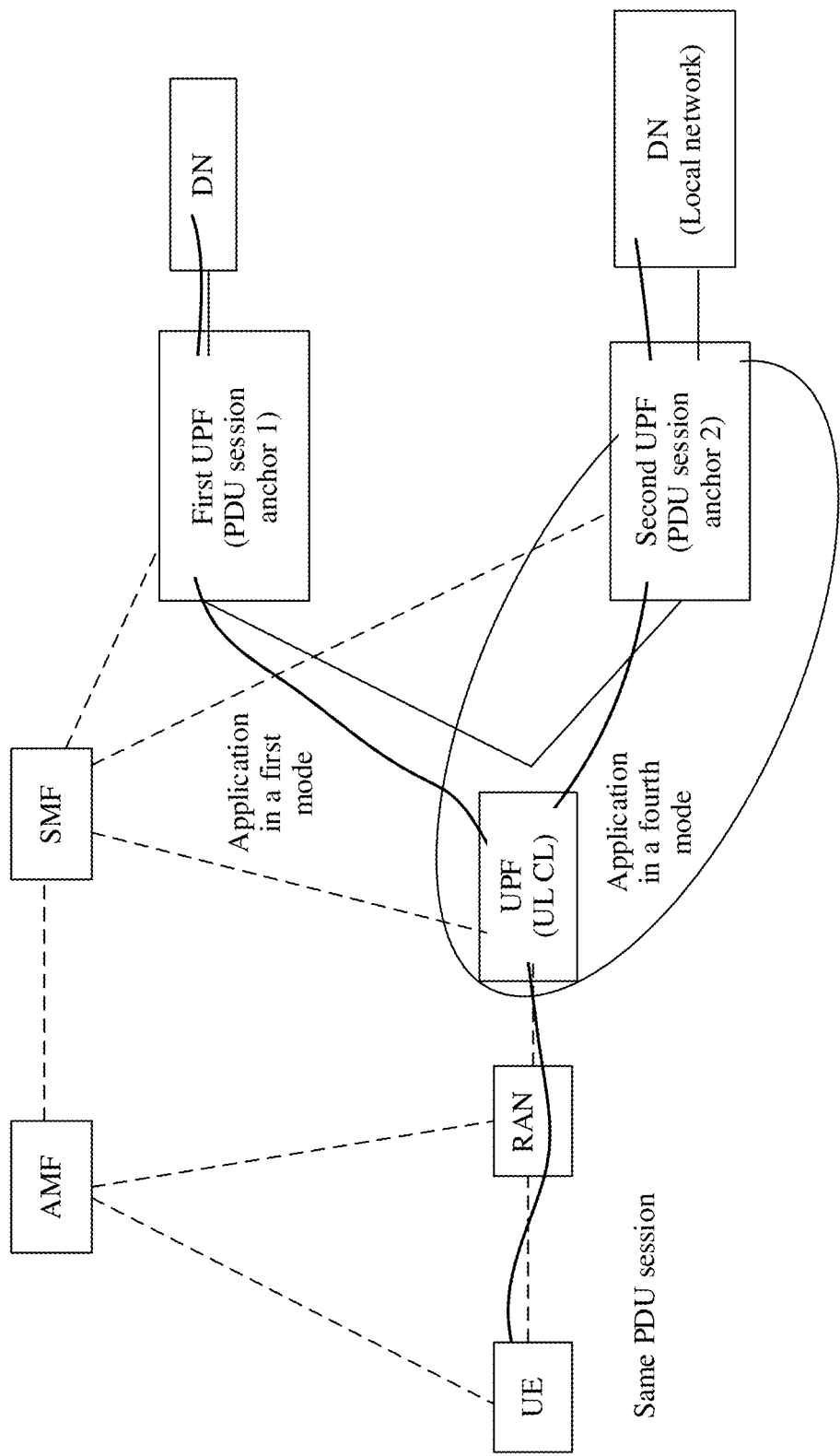
FIG. 2B is a diagram of another 5G system architecture according to this application.

In this application, the application in the fourth mode may be transmitted to the DN through a PDU session for transmitting only the application data packet in the fourth mode (for example, the PDU session for transmitting only the application in the second mode in FIG. 1A is changed to be used to transmit only the application in the fourth mode, so that a network architecture shown in FIG. 1B is obtained). Herein, "a PDU session for transmitting only the application data packet in the fourth mode" means that session and service continuity features of application data packets transmitted on the PDU session are all the fourth mode, and this is applicable to the following descriptions. Alternatively, as shown in FIG. 2B, the application in the fourth mode may be transmitted to the DN through the PDU session for transmitting the application data packet in the first mode. In other words, the PDU session for transmitting the application data packet in the first mode may also be used to transmit the application data packet in the fourth mode (to be specific, a route used to transmit the application in the second mode in FIG. 2A is changed to be used to transmit the application in the fourth mode, so that a network architecture shown in FIG. 2B is obtained). Alternatively, the application in the fourth mode may be transmitted by using a 5G system architecture shown in FIG. 4B. Both a PDU session for transmitting only the application data packet in the fourth mode and the PDU session for transmitting the application data packet in the first mode can be used to transmit the application in the fourth mode between the terminal device and the DN.

Figure 5:
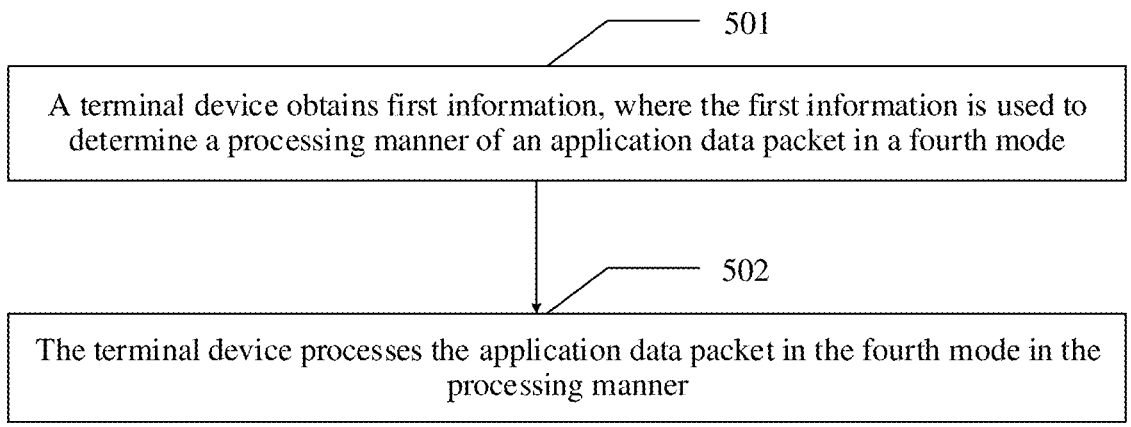
FIG. 5 is a flowchart of a data processing method according to this application.

The following describes a processing method for an application in a fourth mode that is provided in this application. As shown in FIG. 5, the method includes the following operations.

Operation 501: A terminal device obtains first information, where the first information is used to determine a processing manner of an application data packet in the fourth mode.

To be specific, the terminal may know the processing manner of the application data packet in the fourth mode by obtaining the first information, and further process the application data packet in the fourth mode in the known processing manner.

In one embodiment, in this application, the processing manner of the application data packet in the fourth mode mainly include the following two types that are referred to as a processing manner 1 and a processing manner 2. The processing manner 1 is: transmitting the application data packet in the fourth mode through a packet data unit PDU session for transmitting an application data packet in a first mode. The processing manner 2 is: transmitting the application data packet in the fourth mode through a PDU session for transmitting only the application data packet in the fourth mode.

Operation 502: The terminal device processes the application data packet in the fourth mode in the processing manner.

Figure 4B:
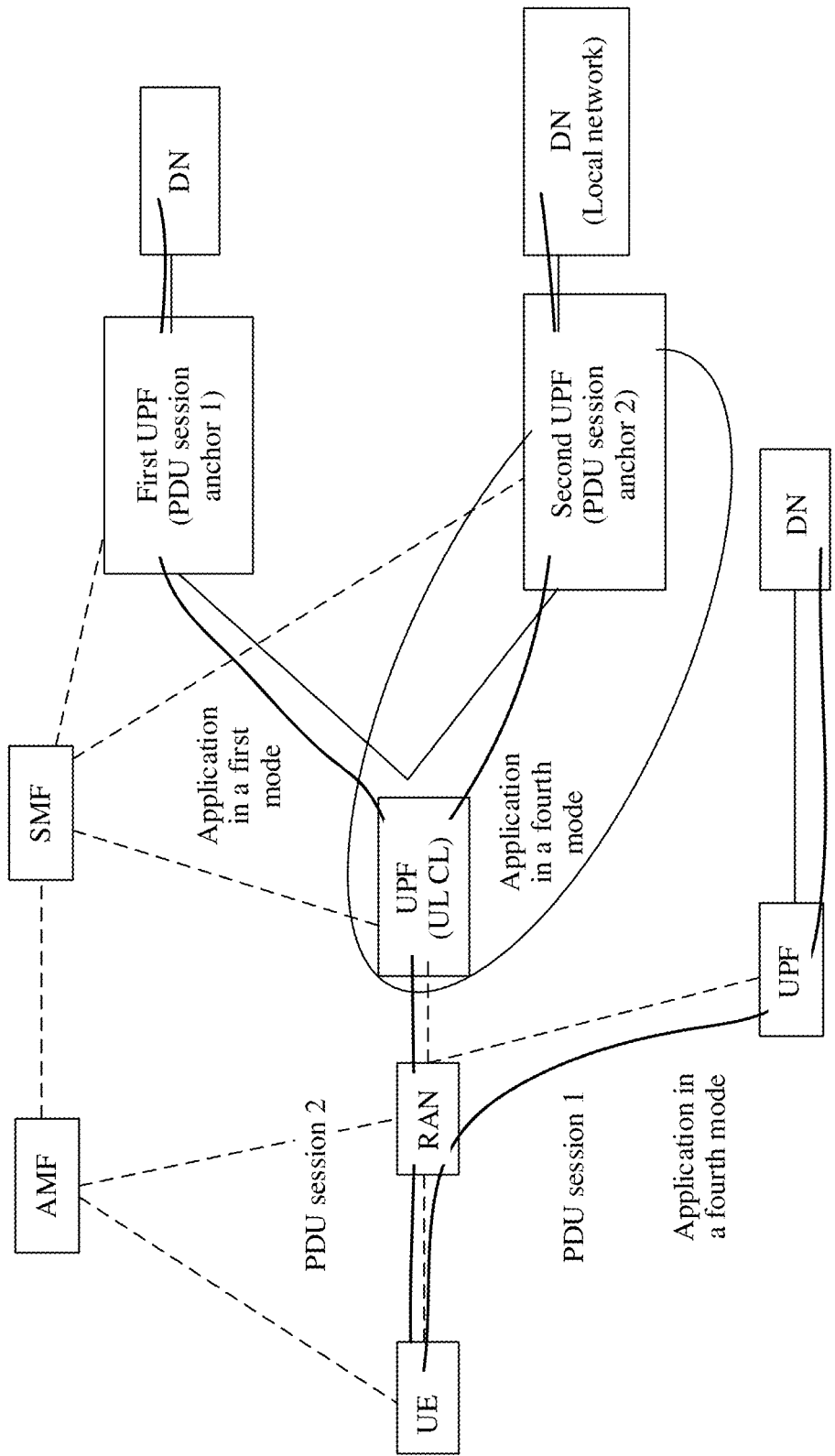
FIG. 4B is a diagram of another 5G system architecture according to this application.

With reference to FIG. 1B, FIG. 2B, and FIG. 4B, two example methods are used to describe the processing method for an application in a fourth mode in this application in detail.

Example method 1: The terminal device receives the first information sent by a network device. To be specific, the processing manner of the application data packet in the fourth mode is indicated by the network device.

In the example method 1, for the application in the fourth mode, the network device instructs the terminal device how to process the application in the fourth mode, and specifically, instructs the terminal device to transmit the application (or the application data packet) in the fourth mode in a processing manner shown in FIG. 1B, to be specific, through the PDU session for transmitting only the application data packet in the fourth mode, or instructs the terminal device to transmit the application (or the application data packet) in the fourth mode in a processing manner shown in FIG. 2B, to be specific, through the PDU session for transmitting the application data packet in the first mode, to implement interaction between the terminal device and a DN for the application.

Figure 6:
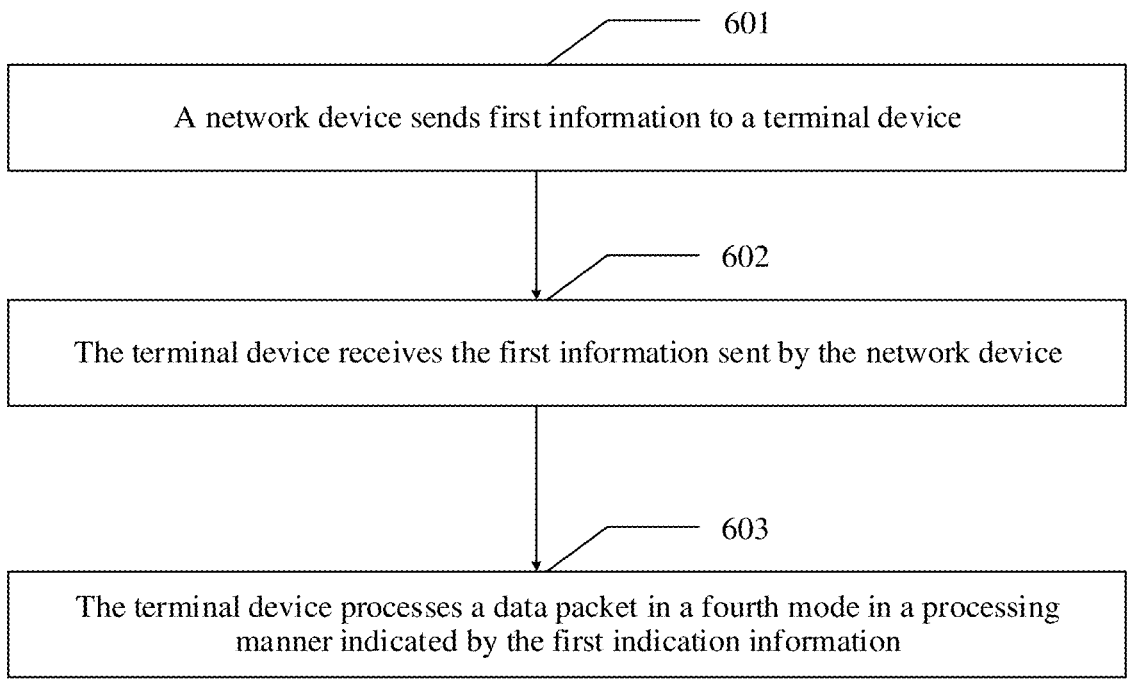
FIG. 6 is a flowchart of a data processing method according to this application.

In this case, this application provides a data processing method. As shown in FIG. 6, the method includes the following operations.

Operation 601: The network device sends the first information to the terminal device.

In one embodiment, the first information may be implemented in at least the following manners.

Manner 1: The first information is a correspondence between an application and a processing manner.

To be specific, the network device sends, to the terminal device, a processing manner corresponding to each application, so that the terminal device can learn of the processing manner corresponding to the application. For example, the processing manners may be sent to the terminal device in a table form.

For example, Table 3 is a table of a correspondence between applications in the fourth mode and processing manners. In other words, Table 3 shows the first information.

TABLE 3

Table of a correspondence between applications and processing manners

| Application | Mode | Processing manner |
|---|---|---|
| APP 9 | Second mode | Processing manner 1 |
| APP 10 | / | Processing manner 2 |
| APP 11 | Second mode | Processing manner 2 |
| APP 12 | Supporting a local access network | Processing manner 1 |
| APP 13 | Second mode | Processing manner 2 |
| APP 14 | / | Processing manner 1 |
| APP 15 | Supporting a local access network | Processing manner 2 |
| ... | ... | ... |

For another example, if processing manners of application data packets in a mode in the fourth mode are the same, the first information may further indicate a processing manner for each mode. For example, for applications in the second mode, processing manners each are the processing manner 1; for applications having no mode information, processing manners each are the processing manner 2; and for applications supporting the local access network, processing manners each are the processing manner 2. Therefore, the first information may be, for example, (the applications in the second mode: the processing manner 1; the applications having no mode information: the processing manner 2; and the applications supporting the local access network: the processing manner 2).

For another example, if processing manners of all application data packets in the fourth mode are the same, to be specific, for applications in the second mode, applications having no mode information, and applications supporting the local access network, processing manners are each the processing manner 1 or the processing manner 2, in this case, the first information may be, for example, (the applications in the fourth mode: the processing manner 1) or (the applications in the fourth mode: the processing manner 2).

In one embodiment, in the foregoing several examples, there are at least the following two examples for indication of a processing manner. The two examples are explicit indication and implicit indication.

The explicit indication means directly indicating the processing manner, to be specific, the foregoing processing manner. The implicit indication may be, for example, indicating network information. In one embodiment, the network information is used to indicate a network capability of the terminal device or a network architecture supported by the terminal device. For example, the network architecture is a first network architecture or a second network architecture. To be specific, the foregoing indicated processing manner is replaced with corresponding network information. One processing manner corresponds to one type of network information. The terminal obtains a corresponding processing manner by learning of network information indicated by the network device.

The network information may be information about the processing manner of the application data packet in the fourth mode, and may be reflected on a network deployment architecture. For example, for the application data packet in the fourth mode, two data processing manners are reflected on different network architectures.

The processing manner 1 is reflected on the first network architecture. In a mobile communications network, one PDU session can include at least two UPF function devices. Herein, the two UPF function devices may be referred to as a first UPF function and a second UPF function. Some application data packets transmitted on the session are sent to the DN network by using the first UPF function device, and some application data packets are sent to the DN network by using the second UPF function device. Application data sent by using the first UPF function to the DN network passes through the second UPF function device. The second UPF function device may transparently transmit the application data packets processed by the first UPF function device. The transparent transmission means that the data packets are not modified. Alternatively, the application data packets may be first processed by the second UPF function device, and then sent by using the first UPF function device to the DN network. In addition, session and service continuity modes of data packets processed by the two UPFs are different. For ease of description, such a mode is referred to as the first network architecture herein. In the network architecture, the processing manner 1 is used. To be specific, the application data packet in the fourth mode is transmitted on the PDU session for transmitting the application data packet in the first mode.

The processing manner 2 is reflected on the second network architecture. The processing manner 2 is reflected on the network deployment architecture as follows: Each PDU session includes only one UPF function device, and application data packets in one mode are transmitted on the PDU session; or each PDU session includes two or more UPF functions, but the PDU session supports only one session and service continuity mode, in other words, the PDU session can be used to transmit only application data packets of applications in a same session and service continuity mode. For ease of description, such a mode is referred to as the second network architecture. In the network architecture, on a PDU session in each mode, only application data packets in the mode are transmitted.

FIG. 1A and FIG. 1B show the second network architecture. FIG. 2A and FIG. 2B show the first network architecture. Therefore, when the network information indicated by the first information is the second network architecture, the processing manner of the application in the fourth mode is the processing manner 2, to be specific, the application data packet in the fourth mode is transmitted through the PDU session for transmitting only the application data packet in the fourth mode; and when the network information indicated by the first information is the first network architecture, the processing manner of the application in the fourth mode is the processing manner 1, to be specific, the application data packet in the fourth mode is transmitted through the PDU session for transmitting the application data packet in the first mode.

Manner 2: The first information is PDU session information. The PDU session information includes PDU session identification information and session and service continuity mode information of an application data packet that can be transmitted on a PDU session.

To be specific, the first information indicates a PDU session by using the PDU session identification information, and further indicates session and service continuity mode information of an application data packet that can be transmitted on the PDU session.

For example, it is assumed that the first information is: (PDU 1: supporting transmission of only the application data packet in the fourth mode). In this case, the first information instructs the terminal device to transmit the application data packet in the fourth mode on the PDU 1, and indicates that a manner of transmitting the application data packet in the fourth mode is: transmission through the PDU session for transmitting only the application data packet in the fourth mode.

For another example, it is assumed that the first information is: (PDU 2: supporting transmission of the application data packet in the first mode and the application data packet in the fourth mode). In this case, the first information instructs the terminal device to transmit the application data packet in the fourth mode on the PDU 2, and indicates that a manner of transmitting the application data packet in the fourth mode is: transmission through the PDU session for transmitting the application data packet in the first mode.

Operation 602: The terminal device receives the first information sent by the network device.

Operation 603: The terminal device processes the data packet in the fourth mode in the processing manner indicated by the first information.

In one embodiment, when the processing manner indicated by the first information is transmitting the application data packet in the fourth mode through the PDU session for transmitting only the application data packet in the fourth mode, the terminal device uses the manner shown in FIG. 1B. If it is determined that the PDU session in the fourth mode has been currently established, the terminal device determines the PDU session in the fourth mode, and transmits the application data packet in the fourth mode on the PDU session. If no PDU session in the fourth mode is currently established, the terminal device triggers establishment of the PDU session in the fourth mode, and transmits the application data packet in the fourth mode on the established PDU session.

In one embodiment, when the processing manner indicated by the first information is transmitting the application data packet in the fourth mode through the PDU session for transmitting the application data packet in the first mode, the terminal device transmits, in the manner shown in FIG. 2B, the application data packet in the fourth mode on the PDU session for transmitting the application data packet in the first mode. To be specific, the application data packet in the first mode and the application data packet in the fourth mode share a same PDU session. If it is determined that the PDU session in the first mode has been currently established, the terminal device determines the PDU session in the first mode, and transmits the application data packet in the fourth mode on the PDU session. If no PDU session in the first mode is currently established, the terminal device triggers establishment of the PDU session in the first mode, and transmits the application data packet in the fourth mode on the established PDU session.

Figure 7:
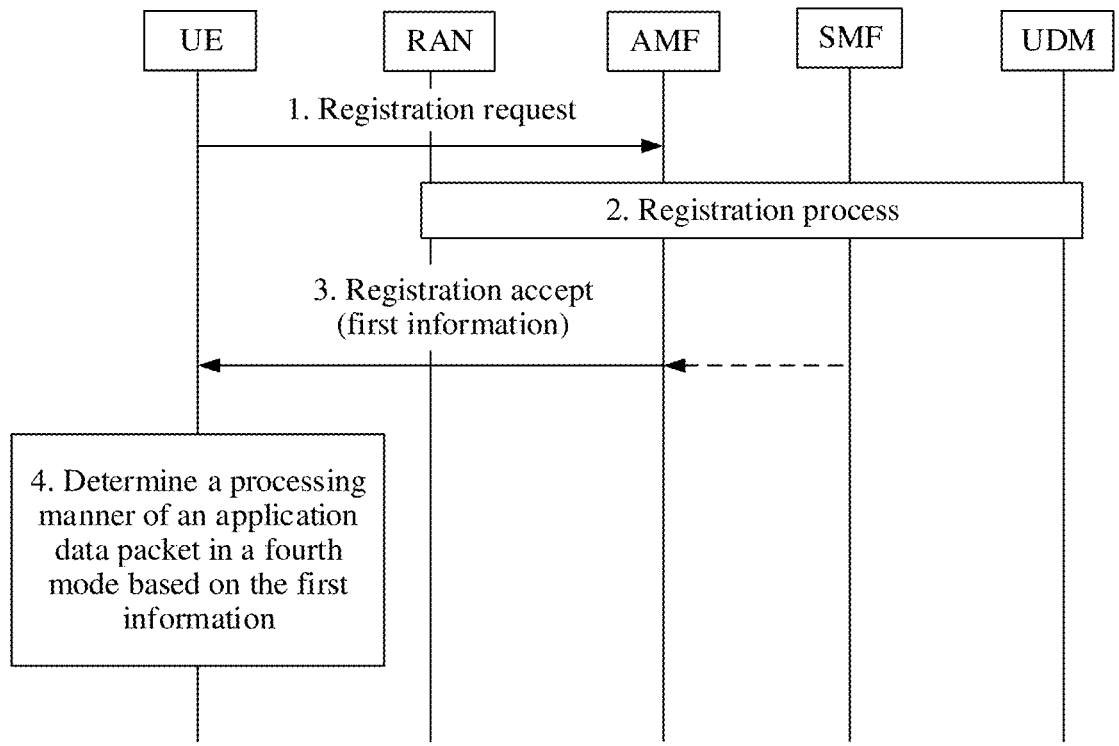
FIG. 7 is a flowchart of a data processing method according to this application.

The following provides a specific example procedure with reference to FIG. 7.

Specifically, that the terminal device is UE is used as an example. When the UE is registered with a network, the network device may send the first information to the UE in this process. The network device may be an AMF device, or may be an SMF device.

In FIG. 7, the following network elements are included: the UE, a RAN device (for example, a base station), the AMF device, the SMF device, and a user data management (UDM) device. The UDM device is a user data management system in a mobile core network.

As shown in FIG. 7, the following operations are included.

Operation 1: The UE sends a registration request message to the AMF device.

Operation 2: The AMF device registers the UE with the data network.

This process belongs to the prior art, and details are not described herein.

Operation 3: The AMF device sends a registration accept message to the UE by using the RAN device.

The registration accept message includes the first information, to indicate the processing manner of the application data packet in the fourth mode to the UE. A specific form of the first information is not limited. The first information may indicate network information, or may indicate the processing manner of the application data packet. The first information may be sent by the AMF device to the UE, or may be sent by the SMF device to the UE by using the AMF device. To be specific, the network device may be the AMF device, or may be the SMF device.

Operation 4: The UE determines the processing manner of the application data packet in the fourth mode based on the first information.

It should be noted that a network side is not limited to notifying the UE of the first indication information in a registration process described in operation 1 to operation 3, and the network side may notify the UE of the first indication information in an OMA DM manner. A notification moment is not limited, and may be before the registration process.

After receiving the first information, the UE determines the processing manner of the application data packet in the fourth mode.

(a) If the first information indicates that the application data packet in the fourth mode can be transmitted on the PDU session for transmitting the application data packet in the first mode, and if there has been the PDU session for transmitting the data packet in the first mode, the UE transmits the application data packet in the fourth mode on the PDU session, otherwise, the UE may initiate a PDU session establishment process.

(b) If the first information indicates that the PDU session for transmitting only the application data packet in the fourth mode is used for the application data packet in the fourth mode, and if there is the PDU session in the fourth mode in the data network, the UE transmits the application data packet in the fourth mode on the PDU session, otherwise, the UE initiates an establishment process of the PDU session in the fourth mode.

It should be noted that "a PDU session for transmitting only the application data packet in the fourth mode" mentioned in this application indicates that there is only one behavior mode of the application data packet transmitted on the PDU session. To be specific, a UPF function in the PDU session has a service area. After the UE moves out of the service area, the network side reselects a UPF function device. A session and service continuity mode of the data packet transmitted on the PDU session may be referred to as a second mode, or may be referred to as the fourth mode.

Example method 2: The terminal device obtains the first information preconfigured by the terminal device.

In this case, the terminal device stores mode information corresponding to an application in a DN. A storage manner is not limited. For example, the mode information may be stored in a table form or the like. Storage in a table form is used as an example, referring to Table 3.

Alternatively, a manner shown in Table 4 may be used. A processing manner of an application data packet in the second mode corresponds to indication information (for example, the indication information is "local"), or does not correspond to indication information. If the application data packet in the second mode corresponds to the indication information, the used processing manner is: transmission through the PDU session for transmitting the application data packet in the first mode. If the application data packet in the fourth mode does not correspond to the indication information, the used processing manner is: transmission through the PDU session for transmitting only the application data packet in the fourth mode. In addition, an application data packet in the fourth mode that has no mode information carries no indication information, and a used processing manner is: transmission through the PDU session for transmitting the application data packet in the first mode. If the application data packet in the fourth mode is an application data packet supporting a local access network, the application data packet also corresponds to the indication information such as "local", and a used processing manner is: transmission through the PDU session for transmitting the application data packet in the first mode.

TABLE 4

Table of a correspondence between applications and processing manners

| Application | Mode | Indication information |
|---|---|---|
| APP 16 | Second mode | local |
| APP 17 | / | / |
| APP 18 | Second mode | / |
| APP 19 | Supporting a local access network | local |
| APP 20 | Second mode | / |
| APP 21 | / | / |
| APP 22 | Supporting a local access network | local |
| ... | ... | ... |

For example, referring to Table 4, for application data packets (for example, the APP 19 and the APP 22) supporting the local access network, corresponding indication information is "local". Therefore, both processing manners are: transmission through the PDU session for transmitting the application data packet in the first mode. For application data packets (for example, the APP 17 and the APP 21) having no mode information, corresponding indication information is null. To be specific, the application data packets do not correspond to indication information. Therefore, both processing manners are: transmission through a PDU session for transmitting only the application data packet in the mode. For the application data packet in the second mode, if corresponding indication information is "local", for example, the application data packet is the APP 16, a processing manner is: transmission through the PDU session for transmitting the application data packet in the first mode; or if corresponding indication information is null, to be specific, the application data packet in the second mode does not correspond to indication information, for example, the application data packet is the APP 18 or the APP 20, a processing manner is: transmission through a PDU session for transmitting only the application data packet in the mode.

Figure 8:
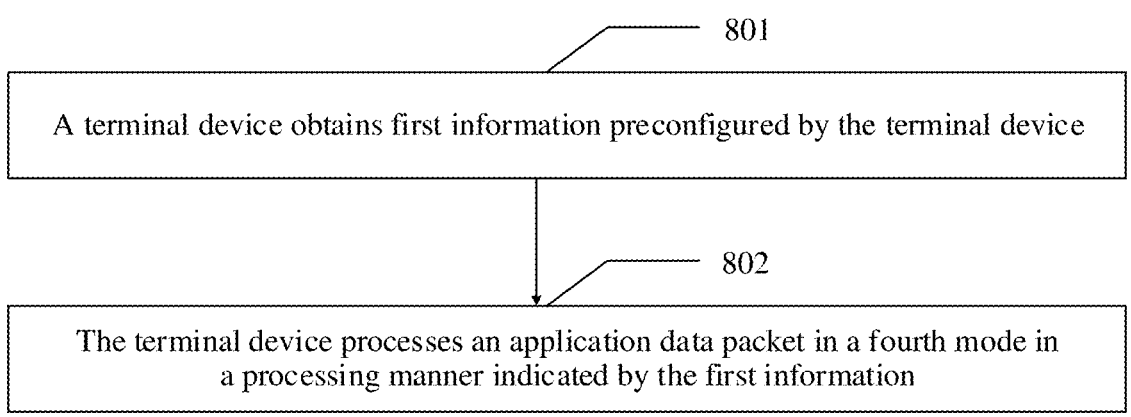
FIG. 8 is a flowchart of a data processing method according to this application.

For the example method 2, this application provides a data processing method. As shown in FIG. 8, the method includes the following operations.

Operation 801: The terminal device obtains the first information preconfigured by the terminal device.

Operation 802: The terminal device processes the application data packet in the fourth mode in the processing manner indicated by the first information.

The example method 2 is further described below by using two methods depending on whether the network device indicates, to the terminal device, information about a PDU session for transmitting the application data packet.

Method 1: The network device indicates, to the terminal device, the information about the PDU session for transmitting the application data packet.

In the method, before operation 802, the data processing method further includes: receiving, by the terminal, the PDU session information sent by the network device. The PDU session information includes PDU session identification information and session and service continuity mode information of an application data packet that can be transmitted on a PDU session that are used to indicate the PDU session and a transmission mode supported by the PDU session. For example, the session and service continuity mode information of the application data packet that can be transmitted on the PDU session is supporting transmission of only the application data packet in the fourth mode, or supporting transmission of the application data packet in the first mode and the application data packet in the fourth mode.

When the terminal device receives the PDU session information sent by the network device, where for example, the PDU session information is: a first PDU session is included, the first PDU session supports transmission of the application data packet in the first mode and the application data packet in the fourth mode, and more specifically, the first PDU session includes a first UPF device configured to transmit the application data packet in the first mode and a second UPF device (for example, a UL CL device and/or an IP anchor 2) configured to process the application data packet in the fourth mode, the terminal device may transmit the application data packet in the fourth mode on the first PDU session, to be specific, the application data packet in the fourth mode is distributed by the UL CL device to the second UPF device, and is processed by the second UPF device and sent to the DN.

Therefore, operation 802 may be specifically: The terminal device transmits the application data packet in the fourth mode on the first PDU session.

For example, referring to FIG. 4B, assuming that a currently established PDU session 2 is the first PDU session, and both a first route (to be specific, a route passing through a PDU session anchor 1) used to transmit the application data packet in the first mode and a second route (to be specific, a route passing through a PDU session anchor 2) used to transmit the application data packet in the fourth mode have been established, the application data packet in the fourth mode is directly transmitted on the second route.

Figure 9:
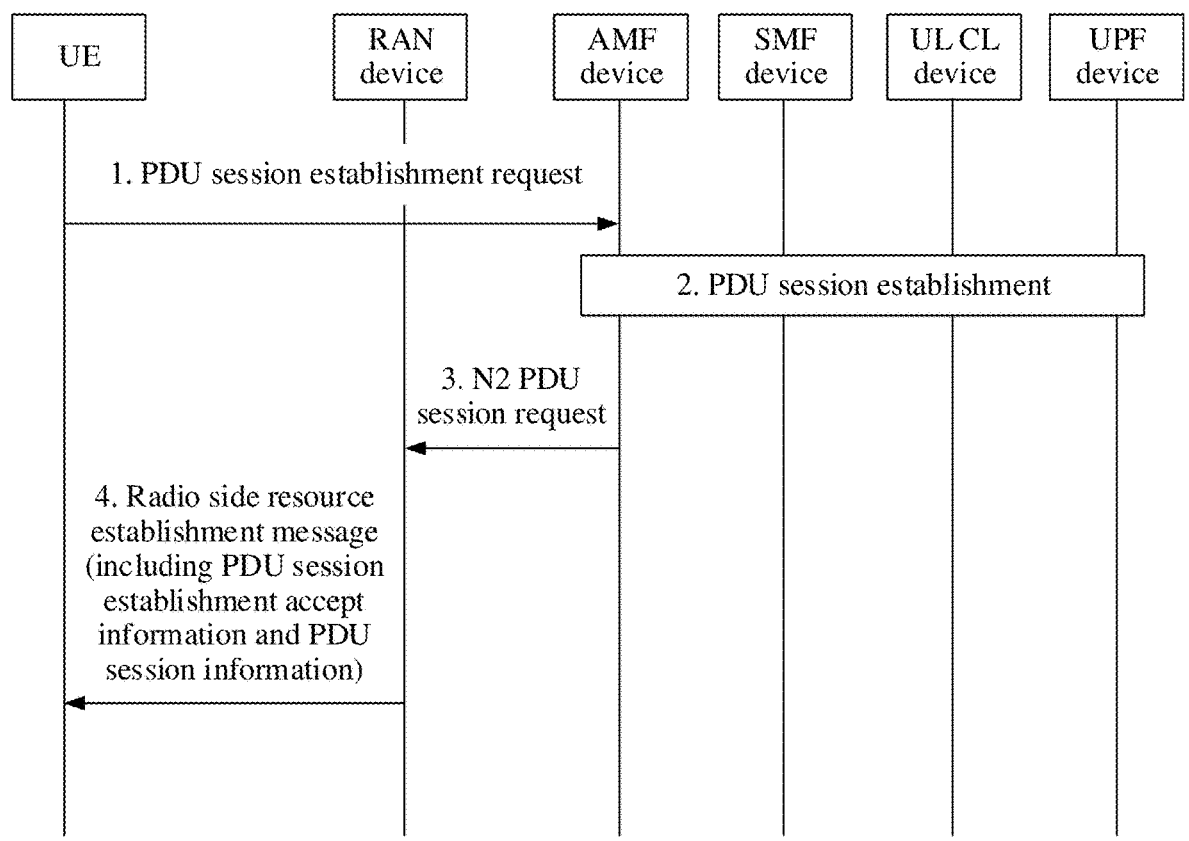
FIG. 9 is a flowchart of a data processing method according to this application.

With reference to FIG. 9, the following provides a specific example method for a process in which the network device sends the PDU session information to the terminal device in the method 1, and the example method includes the following operations.

An example in which UE initiates a PDU session establishment process is used for description.

Operation 1: The UE sends a PDU session establishment request to an AMF device.

Operation 2: The AMF device initiates establishment of a PDU session.

This process belongs to the prior art, and details are not described herein.

Operation 3: The AMF device sends an N2 PDU session request message to a RAN device.

Operation 3 is used to establish a data transmission channel on a radio side.

Operation 4. The RAN device sends a radio side resource establishment message to the UE.

The radio side resource establishment message includes PDU session establishment accept information and the PDU session information.

In addition, in addition to the PDU session establishment process initiated by the UE, in a PDU session modification process initiated on a network side, the UE may be notified of the PDU session information. For example, when the UE moves to a specific area, the network side may select the UL CL device and the second UPF device for the UE, initiate the PDU session modification process, and connect the UL CL device and the second UPF device to the PDU session, to provide a locally processed data service to the UE. In this process, the network side notifies the UE of the PDU session information.

Alternatively, in another scenario, in the PDU session establishment process initiated by the UE, the network side may notify the UE of the information about the PDU session for transmitting the application data packet. Specifically, the UE cannot determine that the application data packet in the fourth mode can be transmitted on an established PDU session for transmitting the application data packet in the first mode, and therefore initiates the PDU session establishment process. In the PDU session establishment process, a network side device notifies the UE of the information about the PDU session for transmitting the application data packet.

Operation 1: The UE sends a PDU session establishment request to an AMF device.

The PDU session establishment request may include mode information of an application in which a service is performed and/or application information (for example, an application identifier).

Operation 2: If a network side device (the AMF device or an SMF device) determines that a PDU session establishment process initiated by the UE is unnecessary, or a network side device determines that the application data packet initiated by the UE can be transmitted on an established PDU session, the network side device rejects the PDU session establishment process, and notifies the UE of the information about the PDU session for transmitting the application data packet. Specifically, there may be a plurality of representation forms, including but not limited to: indicating that the application data packet in the fourth mode may be transmitted on the PDU session for transmitting the application data packet in the first mode; and indicating information about a PDU session for transmitting the application data packet in the mode.

Method 2: If the terminal device cannot determine the information about the PDU session for transmitting the data packet:

In this method, the network device does not notify the terminal device of a PDU session that can be used for the application data packet in the fourth mode. To be specific, the terminal device cannot determine the PDU session that can be used for the application data packet in the fourth mode.

In this case, in a network architecture shown in FIG. 1B, for a PDU session 2, only a first route used to transmit the application data packet in the first mode has been currently established, and a second route used to transmit the application data packet in the fourth mode has not been established. Therefore, operations of transmitting, by the terminal device, the application data packet in the fourth mode are as follows.

Operation A: The terminal device determines that the processing manner of the application data packet in the fourth mode is transmitting the application data packet in the fourth mode through the PDU session in the first mode.

Operation B: The terminal device transmits the application data packet in the fourth mode on the PDU session in the first mode.

In operation B, because the second route used to transmit the application data packet in the fourth mode has not been established, the application data packet in the fourth mode that is transmitted by the terminal device in this case is actually transmitted by a network side to the data network on the first route through the PDU session in the first mode. The first route is originally used to transmit the application data packet in the first mode.

Operation C: After receiving, on the PDU session for transmitting the application data packet in the first mode, the application data packet in the fourth mode that is sent by the terminal device, a first UPF device generates a data flow event, and sends the data flow event to an SMF device.

Operation D: If a data flow corresponding to the data flow event needs to be locally routed, the SMF device receives the data flow event reported by the first UPF device, and connects a UL CL device and a second UPF device to the PDU session, so that the application data packet in the fourth mode that is sent by the terminal device is distributed by the UL CL device to the second UPF device.

Specifically, the SMF device initiates a PDU session modification process, and connects the UL CL device to the PDU session. The UL CL device, the second UPF device, and the first UPF function device jointly provide services for the PDU session. Therefore, after the UL CL device and the second UPF device are connected to the PDU session for transmitting the application data packet in the first mode, the second route is established. A network architecture changes from the network architecture shown in FIG. 1B to a network architecture shown in FIG. 4B. Details are as follows: The second route is added to the PDU session (for example, the PDU session 2 shown in FIG. 1B) for transmitting the application data packet in the first mode, to transmit the data packet of the application in the fourth mode.

The adding the second route is specifically: selecting one UL CL device and one second UPF device, where the UL CL device is configured to distribute application data packets through different routes, so that the application data packets are distributed through the first route or the second route. Specifically, the application data packet in the first mode is transmitted to the data network through the first route, and the application data packet in the fourth mode is transmitted to the data network through the second route.

Therefore, after the second route is established, the application data packet in the fourth mode is directly transmitted to the DN through the second route subsequently.

In one embodiment, whether the data flow corresponding to the data flow event needs to be locally routed may be determined by the first UPF device and then notified to the SMF device. Specifically, the determining and notifying may be performed before operation A, or may be performed between operation A and operation B, or may be performed between operation B and operation C, or may be performed between operation C and operation D.

Figure 10:
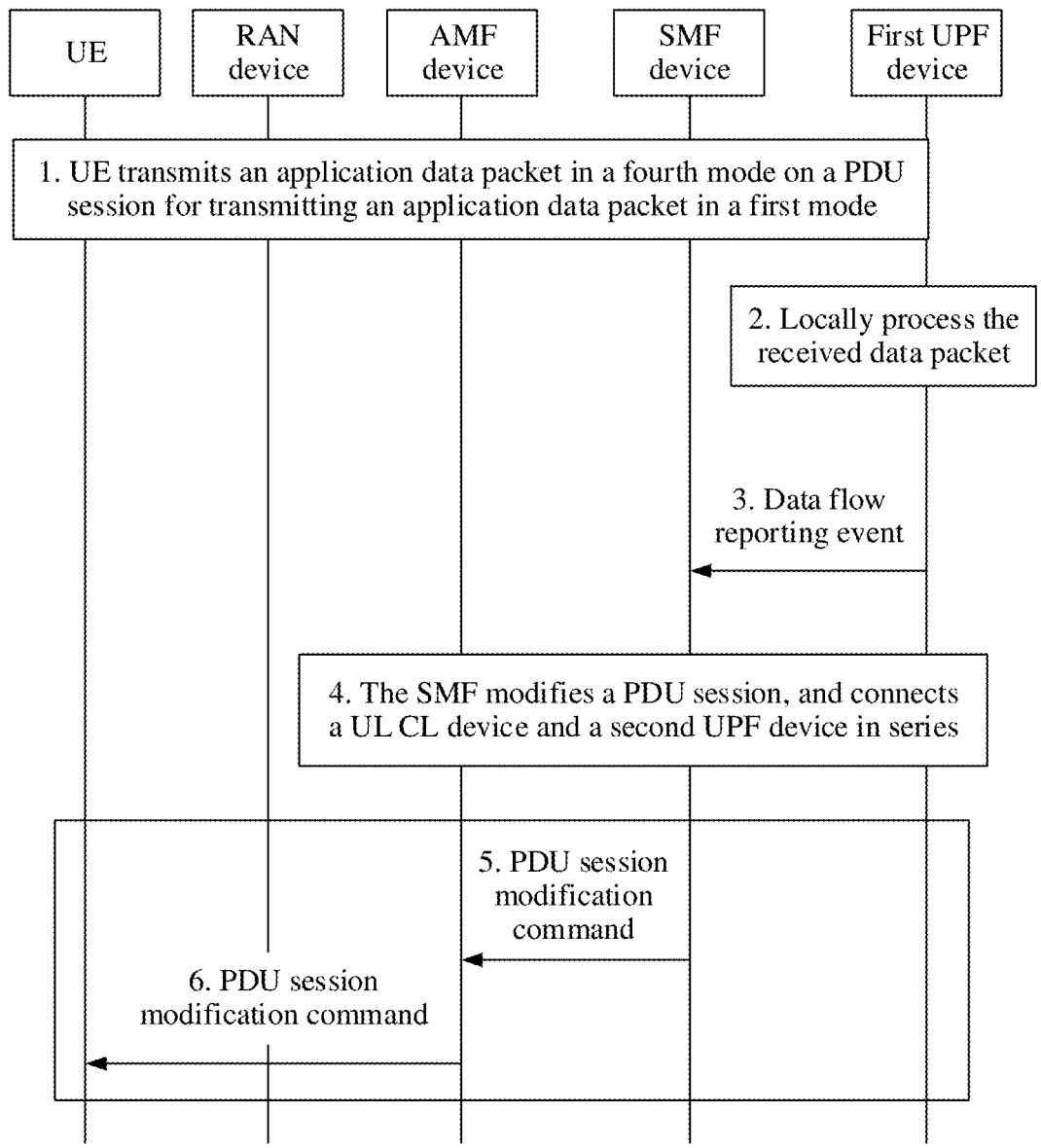
FIG. 10 is a flowchart of a data processing method according to this application.

With reference to FIG. 10, the following provides a specific example method for a process in which the application data packet in the fourth mode is transmitted between the terminal device and the DN in the method 2. It should be noted that:

For the network side, the PDU session in the first mode has been established, but no UL CL device and no second UPF device are connected to the PDU session (to be specific, the second route used to transmit the application data packet in the fourth mode has not been established). In other words, when the UE transmits a data packet on the PDU session, no local processing is performed on the data packet by using the UL CL device and the second UPF device.

For the terminal device, processing logic is added: Application data packets in the fourth mode are all transmitted on the PDU session in the first mode.

Referring to FIG. 10, the example method includes the following operations.

Operation 1: The UE transmits the application data packet in the fourth mode on the PDU session for transmitting the application data packet in the first mode.

Operation 2. The first UPF device receives the application data packet in the fourth mode, and determines, based on feature information of a locally routed data packet, that the application data packet in the fourth mode needs to be locally processed.

The first UPF device is a UPF device (namely, a PDU session anchor 1) in the first route in the first mode in FIG. 4B. In this case, the second route is temporarily not established. To be specific, a UL CL device and a PDU session anchor 2 in FIG. 4B have not been connected to the PDU session.

Operation 3: The first UPF device generates the data flow event, and reports the data flow event to the SMF device.

In this case, for the received application data packet in the fourth mode, a processing manner of the first UPF device may be discarding or temporary buffering.

Operation 4: The SMF device modifies the PDU session, and selects a UL CL device and a second UPF device to connect to the PDU session.

To be specific, the second route used to transmit the application data packet in the fourth mode is established.

Operation 5: The SMF device sends a PDU session modification command to an AMF device.

Operation 6: The AMF device forwards the PDU session modification command to the UE by using a RAN device.

After the UL CL device and the second UPF device are connected to a network, and when an uplink data flow is transmitted on the PDU session, the UL CL device may determine, based on feature information of a local data flow, whether the uplink data flow reaches the DN network through the first UPF device (namely, the first route) or reaches the DN network through the second UPF device (namely, the second route).

In the foregoing embodiments provided in this application, the data processing method provided in the embodiments of this application is described separately from a perspective of network elements and from a perspective of interaction between the network elements. It may be understood that, to implement the foregoing functions, the network elements, such as the terminal device (for example, the UE), the network device (for example, the SMF device and the AMF device), and the base station, include corresponding hardware structures and/or software modules for performing the functions. A person skilled in the art should be easily aware that, in combination with the examples of units and algorithms operations described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 11:
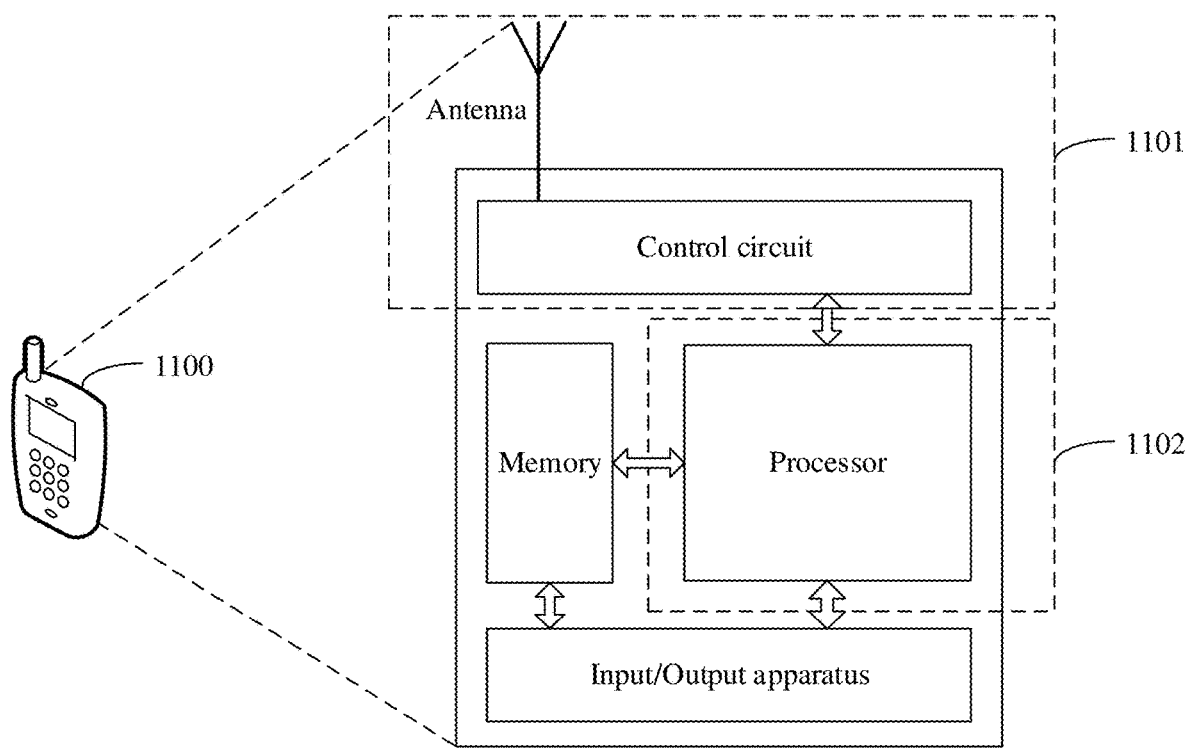
FIG. 11 is a schematic structural diagram of a terminal device according to this application.

Based on the same inventive concept, an embodiment of this application further provides a terminal device 1100. For ease of description, FIG. 11 shows only main components of the terminal device. As shown in FIG. 11, the terminal device 1100 includes a processor, a memory, a control circuit, an antenna, and an input/output apparatus. The processor is mainly configured to: process a communication protocol and communication data, control the entire terminal device, execute a software program, and process data of the software program. For example, the processor is configured to support the terminal device 1100 in performing the methods performed by the terminal device 1100 in the embodiments shown in FIG. 5 to FIG. 10. The memory is mainly configured to store the software program and the data. The control circuit is mainly configured to perform conversion between a baseband signal and a radio frequency signal, and process the radio frequency signal. A combination of the control circuit and the antenna may also be referred to as a transceiver that is mainly configured to receive and send a radio frequency signal in an electromagnetic wave form. The input/output apparatus such as a touchscreen, a display screen, or a keyboard is mainly configured to receive data entered by a user, and output data to the user.

After the terminal device is powered on, the processor may read the software program in the memory, explain and execute an instruction of the software program, and process the data of the software program. When data needs to be wirelessly sent, the processor performs baseband processing on the to-be-sent data, and outputs a baseband signal to a radio frequency circuit. After performing radio frequency processing on the baseband signal, the radio frequency circuit sends a radio frequency signal by using the antenna in an electromagnetic wave form. When data is sent to the terminal device 1100, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 11 shows only one memory and only one processor. In one embodiment, there may be a plurality of processors and a plurality of memories. The memory may also be referred to as a storage medium, a storage device, or the like. This is not limited in this application.

In one embodiment, the processor may include a baseband processor and a central processing unit. The baseband processor is mainly configured to process the communication protocol and the communication data. The central processing unit is mainly configured to: control the entire terminal device 1100, execute the software program, and process the data of the software program. The processor in FIG. 11 is integrated with functions of the baseband processor and the central processing unit. A person skilled in the art may understand that, the baseband processor and the central processing unit may be independent processors, and are interconnected by using a technology such as a bus. A person skilled in the art may understand that the terminal device may include a plurality of baseband processors to adapt to different network standards. The terminal device 1100 may include a plurality of central processing units to enhance a processing capability of the terminal device 1100. Components of the terminal device 1100 may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the memory in a form of the software program. The processor executes the software program to implement a baseband processing function.

For example, in this application, the antenna and the control circuit that have receiving and sending functions may be considered as a transceiver unit 1101 of the terminal device 1100, and the processor having a processing function may be considered as a processing unit 1102 of the terminal device 1100. As shown in FIG. 11, the terminal device 1100 includes the transceiver unit 1101 and the processing unit 1102. The transceiver unit may also be referred to as a transceiver, a transceiver machine, a transceiver apparatus, or the like. In one embodiment, a component that is in the transceiver unit 1101 and that is configured to implement a receiving function may be considered as a receiving unit, and a component that is in the transceiver unit 1101 and that is configured to implement a sending function may be considered as a sending unit. To be specific, the transceiver unit 1101 includes the receiving unit and the sending unit. For example, the receiving unit may also be referred to as a receiver machine, a receiver, a receiver circuit, or the like, and the sending unit may be referred to as a transmitter machine, a transmitter, a transmitter circuit, or the like.

In downlink, a downlink signal (including data and/or control information) sent by a network device is received by using the antenna. In uplink, an uplink signal (including data and/or control information) is sent to the network device by using the antenna. In the processor, service data and a signaling message are processed. These units perform processing based on a radio access technology used in a radio access network (for example, an access technology in LTE, NR, and another evolved system). The processor is further configured to control and manage an action of the terminal device, to perform processing performed by the terminal device in the foregoing embodiments. The processor is further configured to support the terminal device in performing processing processes related to the terminal device in FIG. 5 to FIG. 10.

It may be understood that FIG. 11 shows only a simplified design of the terminal device. In one embodiment, the terminal device may include any quantity of antennas, memories, processors, and the like, and all terminal devices that can implement this application fall within the protection scope of this application.

Specifically, in this application, for example, the transceiver unit is referred to as a transceiver, and the processing unit is referred to as a processor. In this case, the transceiver and the processor in the terminal device 1100 may be specifically configured to perform processing as follows.

The transceiver is configured to obtain first information. The first information is used to determine a processing manner of an application data packet in a fourth mode. The processing manner is transmitting the application data packet in the fourth mode through a packet data unit PDU session for transmitting an application data packet in a first mode, or transmitting the application data packet in the fourth mode through a PDU session for transmitting only the application data packet in the fourth mode.

The processor is configured to process the application data packet in the fourth mode in the processing manner.

In one embodiment, the transceiver is further configured to receive the first information sent by a network device.

In one embodiment, the first information indicates the processing manner or network information.

In one embodiment, the processor is configured to obtain the first information preconfigured by the terminal device 1100.

In one embodiment, when the processing manner is transmitting the application data packet in the fourth mode through the PDU session for transmitting only the application data packet in the fourth mode, the processor is specifically configured to: determine the PDU session in the fourth mode, and transmit the application data packet in the fourth mode on the PDU session.

In one embodiment, when the processing manner is transmitting the application data packet in the fourth mode through the PDU session for transmitting only the application data packet in the fourth mode, the processor is specifically configured to: trigger establishment of the PDU session in the fourth mode, and transmit the application data packet in the fourth mode on the PDU session.

In one embodiment, when the processing manner is transmitting the application data packet in the fourth mode through the PDU session for transmitting the application data packet in the first mode, the processor is specifically configured to: determine the PDU session in the first mode, and transmit the application data packet in the fourth mode on the PDU session.

In one embodiment, when the processing manner is transmitting the application data packet in the fourth mode through the PDU session for transmitting the application data packet in the first mode, the processor is specifically configured to: trigger establishment of the PDU session in the first mode, and transmit the application data packet in the fourth mode on the PDU session.

In one embodiment, the first information is PDU session information. The PDU session information includes PDU session identification information and session and service continuity mode information of an application data packet that can be transmitted on a PDU session.

In one embodiment, the application data packet in the fourth mode includes at least one of the following: an application data packet in a second mode, an application data packet having no mode information, and an application data packet supporting a local access network.

Figure 12:
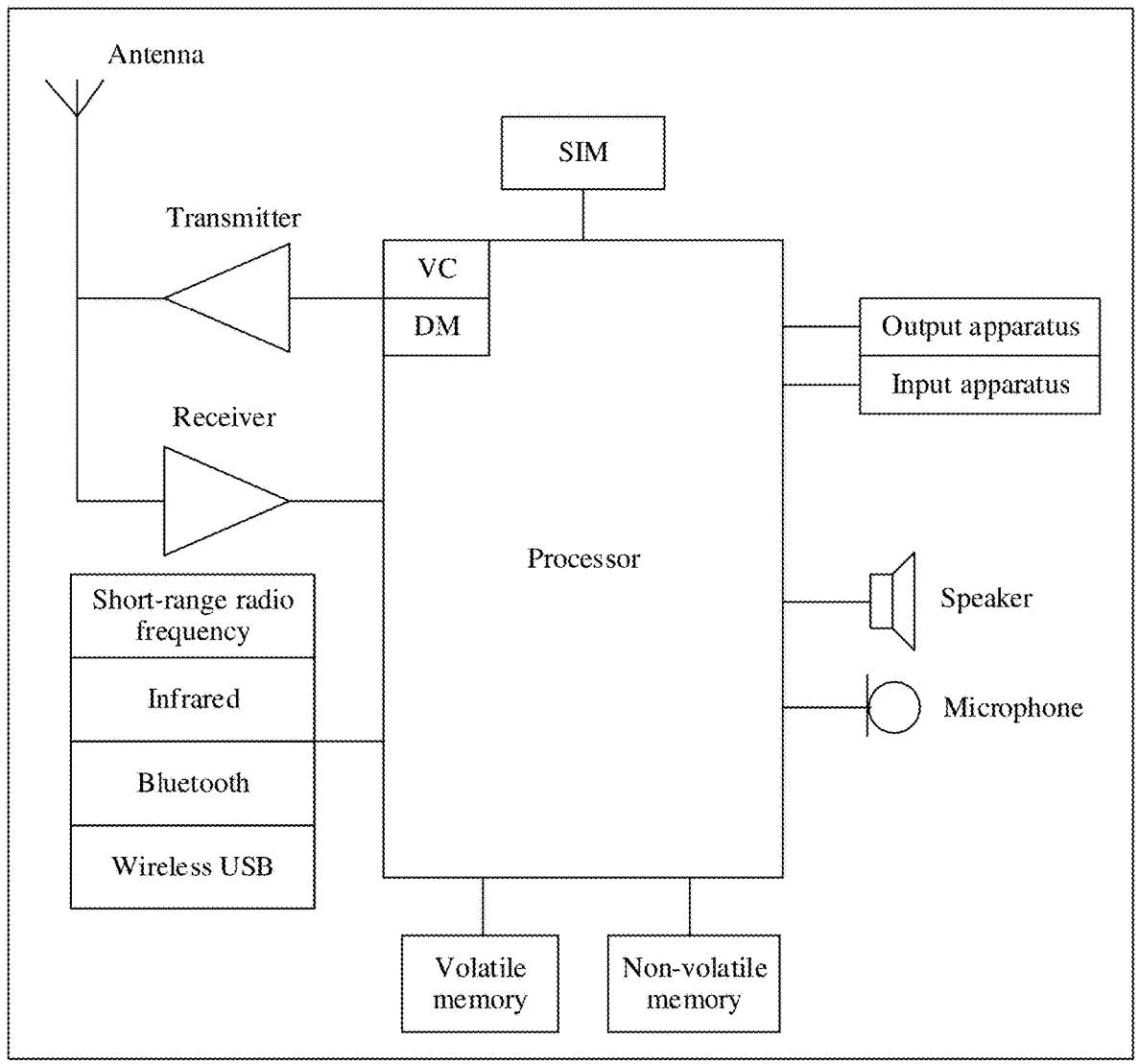
FIG. 12 is a schematic structural diagram of another terminal device according to this application.

FIG. 12 is a schematic diagram of another terminal device according to this application. The terminal device may be configured to perform an operation performed by the terminal device in any one of the foregoing embodiments, and specifically, may perform the operations performed by the terminal device in FIG. 5 to FIG. 10. The processor may include a circuit used for audio/video and logical functions of the terminal device. For example, the processor may include a digital signal processor device, a microprocessor device, an analog-to-digital converter, a digital-to-analog converter, and the like. Control and signal processing functions of a mobile device may be allocated to these devices based on capabilities of these devices. The processor may further include an internal voice coder VC, an internal data modem DM, and the like. In addition, the processor may include a function of operating one or more software programs. The software program may be stored in a memory. Usually, the processor and a stored software instruction may be configured to enable the terminal device to perform an action. For example, the processor can operate a connection program.

The terminal device may further include a user interface. The user interface may include, for example, a headset or a speaker, a microphone, an output apparatus (for example, a display), and an input apparatus. The user interface is operably coupled to the processor. In this case, the processor may include a user interface circuit, and the user interface circuit is configured to control at least some functions of one or more elements (for example, the speaker, the microphone, and the display) of the user interface. The processor and/or the user interface circuit included the processor may be configured to control one or more functions of the one or more elements of the user interface by using a computer program instruction (for example, software and/or firmware) stored in the memory accessible to the processor. Although not shown, the terminal device may include a battery configured to supply power to various circuits related to the mobile device. The circuit is, for example, a circuit that provides mechanical vibration as detectable output. The input apparatus may include a device, for example, a small keypad, a touch display, a joystick, and/or at least one other input device, that allows the apparatus to receive data.

The terminal device may further include one or more circuit connection modules configured to share and/or obtain data. For example, the terminal device may include a short-range radio frequency RF transceiver and/or a detector, and therefore can share data with an electronic device and/or obtain data from the electronic device based on an RF technology. The terminal device may include another short-range transceiver such as an infrared IR transceiver, a radio frequency transceiver, or a wireless universal serial bus USB transceiver. A Bluetooth transceiver can be operated based on a low-power or ultra-low-power Bluetooth technology. In this case, the terminal device, more specifically, the short-range transceiver, can send data to and/or receive data from an electronic device near (for example, within 10 meters of) the apparatus. Although not shown, the terminal device can send data to and/or receive data from an electronic device based on various wireless networking technologies. These technologies include: Wi-Fi, Wi-Fi low-power, and WLAN technologies such as an IEEE 802.11 technology, an IEEE 802.15 technology, and an IEEE 802.16 technology.

The terminal device may include a memory, for example, a subscriber identity module SIM, that can store an information element related to a mobile user. In addition to the SIM, the apparatus may further include another removable and/or fixed memory. The terminal device may include a volatile memory and/or a nonvolatile memory. For example, the volatile memory may include a random access memory RAM. The RAM includes a dynamic RAM and/or a static RAM, an on-chip and/or off-chip cache, and the like. The nonvolatile memory may be embedded and/or removable. The nonvolatile memory may include, for example, a read-only memory, a flash memory, a magnetic storage device such as a hard disk, a floppy disk drive, or a magnetic tape, an optical disc drive and/or a medium, and a nonvolatile random access memory NVRAM. Similar to the volatile memory, the nonvolatile memory may include a cache area used for temporary storage of data. At least a part of the volatile and/or nonvolatile memory may be embedded into the processor. The memory may store one or more software programs, instructions, chunks, data, and the like that may be used by the terminal device to perform a function of a mobile terminal. For example, the memory may include an identifier, for example, an international mobile equipment identity IMEI code, that can uniquely identify the terminal device.

Figure 13:
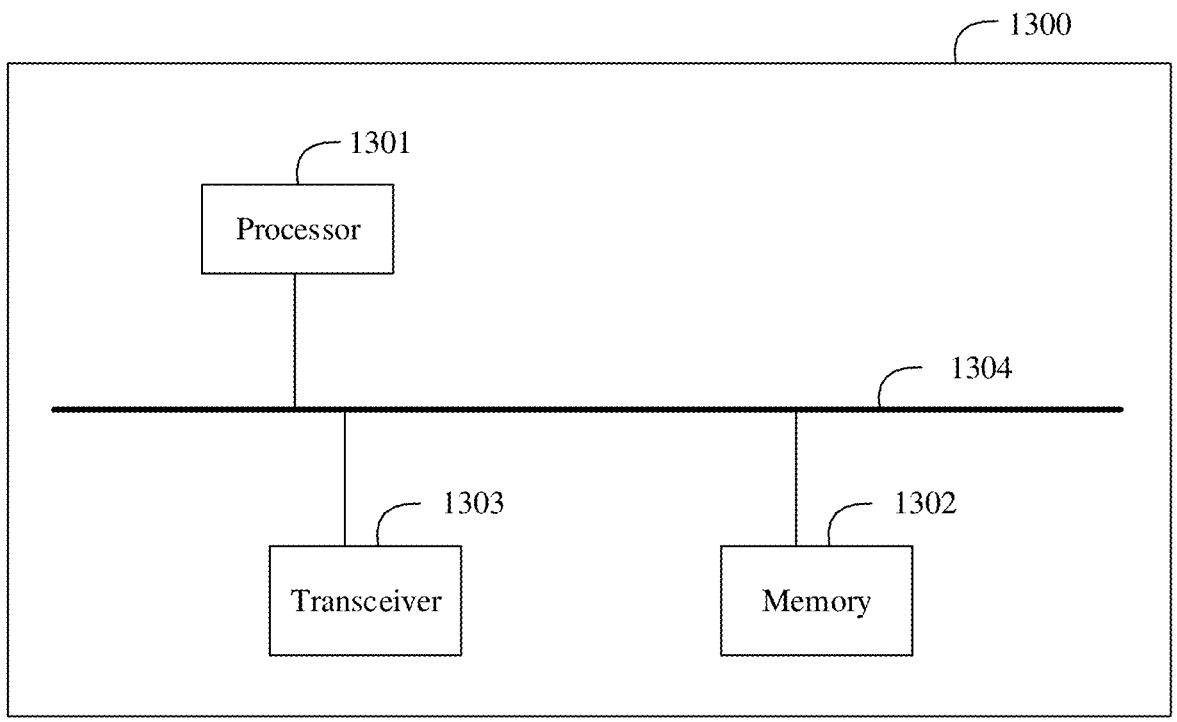
FIG. 13 is a schematic structural diagram of an apparatus according to this application.

Based on the same inventive concept, an embodiment of this application further provides an apparatus 1300. The apparatus 1300 may be a network device, or may be a terminal device. As shown in FIG. 13, the apparatus 1300 includes at least a processor 1301 and a memory 1302, may further include a transceiver 1303, and may further include a bus 1304.

The processor 1301, the memory 1302, and the transceiver 1303 are all connected by using the bus 1304.

The memory 1302 is configured to store a computer executable instruction.

The processor 1301 is configured to execute the computer executable instruction stored in the memory 1302.

When the apparatus 1300 is the network device (for example, an SMF device or an AMF device), the processor 1301 executes the computer executable instruction stored in the memory 1302, so that the apparatus 1300 performs the operations performed by the network device in the embodiments shown in FIG. 5 to FIG. 10 that are provided in the embodiments of this application, or functional units corresponding to the operations are deployed for the network device.

When the apparatus 1300 is the terminal device, the processor 1301 executes the computer executable instruction stored in the memory 1302, so that the apparatus 1300 performs the operations performed by the terminal device in any one of the embodiments provided in the embodiments of this application, or functional units corresponding to the operations are deployed for the terminal device.

The processor 1301 may include different types of processors 1301, or include a same type of processors 1301. The processor 1301 may be any one of the following devices having a computing capability: a central processing unit (CPU), an ARM processor, a field programmable gate array (FPGA), a dedicated processor, or the like. In one embodiment, the processor 1301 may be integrated as a many-core processor.

The memory 1302 may be any one or any combination of the following storage media: a random access memory (RAM), a read-only memory (ROM), a non-volatile memory (NVM), a solid-state drive (SSD), a mechanical hard disk, a magnetic disk, a disk array, and the like.

The transceiver 1303 is configured to perform data exchange between the apparatus 1300 and another device. For example, if the apparatus 1300 is the network device, the network device may perform the method performed by the network device in any one of the foregoing embodiments, and the network device exchanges data with a terminal device by using the transceiver 1303; or if the apparatus 1300 is the terminal device, the terminal may perform the method performed by the terminal device in any one of the foregoing embodiments, and the terminal device exchanges data with a network device by using the transceiver 1303. The transceiver 1303 may be any one or any combination of the following devices having a network access function: a network interface (for example, an Ethernet interface), a wireless network interface card, and the like.

The bus 1304 may include an address bus, a data bus, a control bus, and the like. For ease of representation, the bus is represented by using a thick line in FIG. 13. The bus 1304 may be any one or any combination of the following components used for wired data transmission: an industry standard architecture (ISA) bus, a peripheral component interconnect (PCI) bus, an extended industry standard architecture (EISA) bus, and the like.

The processor 1301 and the transceiver 1303 in the network device may be specifically configured to perform processing as follows.

The transceiver 1303 is configured to send first information to the terminal device, so that the terminal device processes an application data packet in a fourth mode in a processing manner indicated by the first information. The processing manner is transmitting the application data packet in the fourth mode through a PDU session for transmitting an application data packet in a first mode, or transmitting the application data packet in the fourth mode through a PDU session for transmitting only the application data packet in the fourth mode.

In one embodiment, the first information indicates the processing manner or network information.

In one embodiment, the first information is PDU session information. The PDU session information includes PDU session identification information and session and service continuity mode information of an application data packet that can be transmitted on a PDU session.

In one embodiment, the application data packet in the fourth mode includes at least one of the following: an application data packet in a second mode, an application data packet having no mode information, and an application data packet supporting a local access network.

In addition, the processor 1301 and the transceiver 1303 in the network device (the network device is the SMF device) may be further configured to perform processing as follows.

The transceiver 1303 is configured to receive a data flow event reported by a first user plane function UPF device. The data flow event is generated by the first UPF device after the first UPF device receives, on the PDU session for transmitting the application data packet in the first mode, the application data packet in the fourth mode that is sent by the terminal device. The application data packet in the fourth mode is an application data packet in the second mode, an application data packet having no mode information, or an application data packet supporting the local access network.

If a data flow corresponding to the data flow event needs to be locally routed, the processor 1301 is configured to connect, based on the data flow event, an uplink classifier functionality UL CL device and a second UPF device to the PDU session, so that the application data packet in the fourth mode that is sent by the terminal device is distributed by the UL CL device to the second UPF device.

An embodiment of this application provides a computer-readable storage medium. The computer-readable storage medium stores a computer executable instruction. A processor of a terminal device executes the computer executable instruction, so that the terminal device performs the operations performed by the terminal device in the foregoing data processing method provided in this application, or functional units corresponding to the operations are deployed for the terminal device.

An embodiment of this application provides a computer-readable storage medium. The computer-readable storage medium stores a computer executable instruction. A processor of a network device executes the computer executable instruction, so that the network device performs the operations performed by the network device in the foregoing data processing method provided in this application, or functional units corresponding to the operations are deployed for the network device. The network device may be an AMF device, an SMF device, or a core network side device.

An embodiment of this application provides a computer program product. The computer program product includes a computer executable instruction, and the computer executable instruction is stored in a computer-readable storage medium. A processor of a terminal device may read the computer executable instruction from the computer-readable storage medium. The processor executes the computer executable instruction, so that the terminal device performs the operations performed by the terminal device in the foregoing methods provided in the embodiments of this application, or functional units corresponding to the operations are deployed for the terminal device.

An embodiment of this application provides a computer program product. The computer program product includes a computer executable instruction, and the computer executable instruction is stored in a computer-readable storage medium. A processor of a network device may read the computer executable instruction from the computer-readable storage medium. The processor executes the computer executable instruction, so that the network device performs the operations performed by the network device in the foregoing methods provided in the embodiments of this application, or functional units corresponding to the operations are deployed for the network device. The network device may be an AMF device, an SMF device, or a core network side device.

This application further provides a chip system. The chip system includes a processor, configured to support a terminal device in implementing functions in the foregoing aspects, for example, generating, receiving, or processing data and/or information in the foregoing methods. In one embodiment, the chip system further includes a memory. The memory may be configured to store a program instruction and data that are necessary for the terminal device. The chip system may include a chip, or may include a chip and another discrete device.

This application further provides a chip system. The chip system includes a processor, configured to support a network device in implementing functions in the foregoing aspects, for example, generating, receiving, or processing data and/or information in the foregoing methods. In one embodiment, the chip system further includes a memory. The memory is configured to store a program instruction and data that are necessary for the network device. The chip system may include a chip, or may include a chip and another discrete device. The network device may be an AMF device, an SMF device, or a core network side device.

Figure 14:
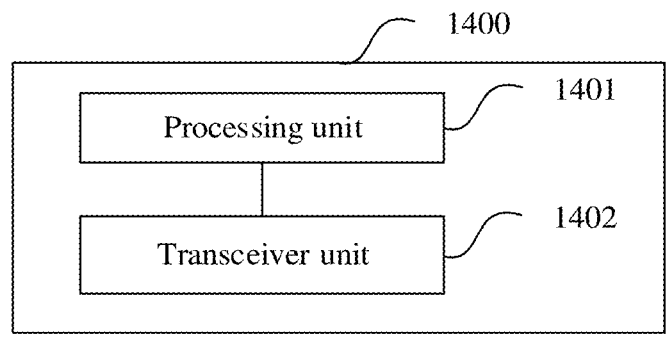
FIG. 14 is a schematic structural diagram of a terminal device according to this application.

Based on the same inventive concept, this application further provides a terminal device 1400. As shown in FIG. 14, the terminal device 1400 includes a processing unit 1401 and a transceiver unit 1402, and may be configured to perform the methods performed by the terminal device in the embodiments shown in FIG. 5 to FIG. 10. In one embodiment, the processing unit 1401 and the transceiver unit 1402 are configured to perform processing as follows.

The transceiver unit 1402 is configured to obtain first information. The first information is used to determine a processing manner of an application data packet in a fourth mode. The processing manner is transmitting the application data packet in the fourth mode through a packet data unit PDU session for transmitting an application data packet in a first mode, or transmitting the application data packet in the fourth mode through a PDU session for transmitting only the application data packet in the fourth mode.

The processing unit 1401 is configured to process the application data packet in the fourth mode in the processing manner.

In one embodiment, the transceiver unit 1402 is further configured to receive the first information sent by a network device.

In one embodiment, the first information indicates the processing manner or network information.

In one embodiment, the processing unit 1401 is configured to obtain the first information preconfigured by the terminal device 1400.

In one embodiment, when the processing manner is transmitting the application data packet in the fourth mode through the PDU session for transmitting only the application data packet in the fourth mode, the processing unit 1401 is specifically configured to: determine the PDU session in the fourth mode, and transmit the application data packet in the fourth mode on the PDU session.

In one embodiment, when the processing manner is transmitting the application data packet in the fourth mode through the PDU session for transmitting only the application data packet in the fourth mode, the processing unit 1401 is specifically configured to: trigger establishment of the PDU session in the fourth mode, and transmit the application data packet in the fourth mode on the PDU session.

In one embodiment, when the processing manner is transmitting the application data packet in the fourth mode through the PDU session for transmitting the application data packet in the first mode, the processing unit 1401 is specifically configured to: determine the PDU session in the first mode, and transmit the application data packet in the fourth mode on the PDU session.

In one embodiment, when the processing manner is transmitting the application data packet in the fourth mode through the PDU session for transmitting the application data packet in the first mode, the processing unit 1401 is specifically configured to: trigger establishment of the PDU session in the first mode, and transmit the application data packet in the fourth mode on the PDU session.

In one embodiment, the first information is PDU session information. The PDU session information includes PDU session identification information and session and service continuity mode information of an application data packet that can be transmitted on a PDU session.

In one embodiment, the application data packet in the fourth mode includes at least one of the following: an application data packet in a second mode, an application data packet having no mode information, and an application data packet supporting a local access network.

Figure 15:
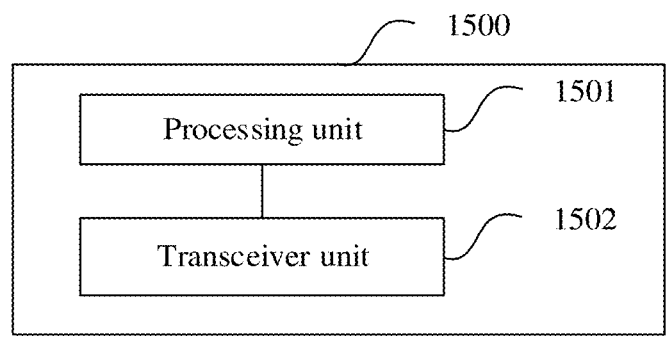
FIG. 15 is a schematic structural diagram of a network device according to this application.

Based on the same inventive concept, this application further provides a network device 1500. As shown in FIG. 15, the network device 1500 includes a processing unit 1501 and a transceiver unit 1502. In one embodiment, the processing unit 1501 and the transceiver unit 1502 are configured to perform processing as follows.

The transceiver unit 1502 is configured to send first information to a terminal device, so that the terminal device processes an application data packet in a fourth mode in a processing manner indicated by the first information. The processing manner is transmitting the application data packet in the fourth mode through a PDU session for transmitting an application data packet in a first mode, or transmitting the application data packet in the fourth mode through a PDU session for transmitting only the application data packet in the fourth mode.

In one embodiment, the first information indicates the processing manner or network information.

In one embodiment, the first information is PDU session information, and the PDU session information includes PDU session identification information and session and service continuity mode information of an application data packet that can be transmitted on a PDU session.

In one embodiment, the application data packet in the fourth mode includes at least one of the following: an application data packet in a second mode, an application data packet having no mode information, and an application data packet supporting a local access network.

In one embodiment, the processing unit 1501 and the transceiver unit 1502 are further configured to perform processing as follows.

The transceiver unit 1502 is configured to receive a data flow event reported by a first user plane function UPF device. The data flow event is generated by the first UPF device after the first UPF device receives, on the PDU session for transmitting the application data packet in the first mode, the application data packet in the fourth mode that is sent by the terminal device. The application data packet in the fourth mode is the application data packet in the second mode, the application data packet having no mode information, or the application data packet supporting the local access network.

If a data flow corresponding to the data flow event needs to be locally routed, the processing unit 1501 is configured to connect, based on the data flow event, an uplink classifier functionality UL CL device and a second UPF device to the PDU session, so that the application data packet in the fourth mode that is sent by the terminal device is distributed by the UL CL device to the second UPF device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person skilled in the art may further understand that various illustrative logical blocks and operations that are listed in this application may be implemented by using electronic hardware, computer software, or a combination thereof. Whether the functions are implemented by using hardware or software depends on particular applications and a design requirement of the entire system. A person skilled in the art may use various methods to implement the functions for each particular application, but it should not be considered that the implementation goes beyond the protection scope of this application.

Various illustrative logic units and circuits described in this application may implement or operate the functions by using a general purpose processor, a digital signal processor, an application-specific integrated circuit (ASIC), a field-programmable gate array (FPGA) or another programmable logic apparatus, a discrete gate or transistor logic, a discrete hardware component, or a design of any combination of the foregoing devices. The general processor may be a microprocessor. In one embodiment, the general processor may also be any traditional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Operations of the methods or algorithms described in this application may be directly embedded into hardware, a software unit executed by a processor, or a combination thereof. The software unit may be stored in a random-access memory RAM), a flash memory, a read-only memory (ROM), an erasable programmable read-only memory (EPROM), a register, a hard disk, a removable disk, a compact disc read-only memory (CD-ROM), or any other form of storage medium in the art. For example, the storage medium may be connected to a processor so that the processor may read information from the storage medium and write information to the storage medium. In one embodiment, the storage medium may further be integrated into a processor. The processor and the storage medium may be disposed in the ASIC. The ASIC may be disposed in a terminal device or a network device. In one embodiment, the processor and the storage medium may alternatively be disposed in different components in the terminal device or the network device.

In one or more examples of designs, the functions described in this application may be implemented by using hardware, software, firmware, or any combination thereof. If the functions are implemented by using software, these functions may be stored in a computer-readable medium or transmitted on a computer-readable medium in a form of one or more instructions or code. The computer-readable medium includes a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber, a twisted pair, a digital subscriber line (DSL) or in a wireless manner, such as infrared, radio, or microwave, the software is included in the defined computer-readable medium. The disc includes a compact disc, a laser disc, an optical disc, a digital versatile disc (DVD), a floppy disk, and a Blu-ray disc. The disk usually copies data by a magnetic means, and the disc optically copies data by a laser means. The foregoing combination may also be included in the computer-readable medium.

A person skilled in the art should be aware that in the foregoing one or more examples, functions described in this application may be implemented by using hardware, software, firmware, or any combination thereof. When the functions are implemented by using software, the foregoing functions may be stored in a computer-readable medium or transmitted as one or more instructions or code on the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application. The foregoing descriptions of this specification in this application may enable a person skilled in the art to use or implement the content of this application. Any modification based on the disclosed content shall be considered obvious in the art. The basic principles described in this application may be applied to other variations without departing from the inventive essence and scope of this application. Therefore, the content disclosed in this application is not limited to the embodiments and designs but may also be extended to a maximum scope that is consistent with the principles and disclosed new features of this application.

What is claimed is:

1. A data processing method, comprising:
obtaining, by a terminal device, first information, wherein the first information is used to determine a processing manner of an application data packet in a fourth mode, wherein:
there are three main modes corresponding to a packet data unit (PDU) session including session and service continuity (SSC) mode 1, SSC mode 2, and SSC mode 3,
the fourth mode describes a feature of data transmission of an application and a feature of service continuity of a PDU session, and
the processing manner includes transmitting the application data packet in the fourth mode through a PDU session for transmitting an application data packet in SSC mode 1, or transmitting the application data packet in the fourth mode through a PDU session for transmitting only the application data packet in the fourth mode; and
processing, by the terminal device, the application data packet in the fourth mode in the processing manner.

2. The method according to claim 1, wherein
when the processing manner is transmitting the application data packet in the fourth mode through the PDU session for transmitting only the application data packet in the fourth mode, the processing, by the terminal device, the application data packet in the fourth mode in the processing manner comprises:
determining, by the terminal device, the PDU session in the fourth mode, and transmitting the application data packet in the fourth mode on the PDU session.

3. The method according to claim 1, wherein
when the processing manner is transmitting the application data packet in the fourth mode through the PDU session for transmitting only the application data packet in the fourth mode, the processing, by the terminal device, the application data packet in the fourth mode in the processing manner comprises:
triggering, by the terminal device, establishment of the PDU session in the fourth mode, and transmitting the application data packet in the fourth mode on the PDU session.

4. The method according to claim 1, wherein
when the processing manner is transmitting the application data packet in the fourth mode through the PDU session for transmitting the application data packet in the SSC mode 1, the processing, by the terminal device, the application data packet in the fourth mode in the processing manner comprises:
determining, by the terminal device, the PDU session in the SSC mode 1, and transmitting the application data packet in the fourth mode on the PDU session.

5. The method according to claim 1, wherein
when the processing manner is transmitting the application data packet in the fourth mode through the PDU session for transmitting the application data packet in the SSC mode 1, the processing, by the terminal device, the application data packet in the fourth mode in the processing manner comprises:
triggering, by the terminal device, establishment of the PDU session in the SSC mode 1, and transmitting the application data packet in the fourth mode on the PDU session.

6. The method according to claim 1, wherein the first information is PDU session information, and the PDU session information comprises PDU session identification information and session and service continuity mode information of an application data packet that can be transmitted on a PDU session.

7. The method according to claim 1, wherein the application data packet in the fourth mode comprises at least one of the following:
an application data packet in a SSC mode 2, an application data packet having no mode information, or an application data packet supporting a local access network.

8. The method according to claim 1, wherein according to the fourth mode:
when the application data packet is transmitted, a user plane function (UPF) device that processes the application data packet has a service area, and when a user equipment (UE) moves, if the UE leaves the service area, the UPF device that processes the application data packet needs to be reselected, or
when the UE moves, at least one UPF device in the PDU session is reselected.

9. A data processing method, comprising:
sending, by a network device, first information to a terminal device, so that the terminal device processes an application data packet in a fourth mode in a processing manner indicated by the first information, wherein:
there are three main modes corresponding to a packet data unit (PDU) session including session and service continuity (SSC) mode 1, SSC mode 2, and SSC mode 3,
the fourth mode describes a feature of data transmission of an application and a feature of service continuity of a PDU session, and
the processing manner includes transmitting the application data packet in the fourth mode through a PDU session for transmitting an application data packet in SSC mode 1, or transmitting the application data packet in the fourth mode through a PDU session for transmitting only the application data packet in the fourth mode.

10. The method according to claim 9, wherein the first information is PDU session information, and the PDU session information comprises PDU session identification information and session and service continuity mode information of an application data packet that can be transmitted on a PDU session.

11. The method according to claim 9, wherein according to the fourth mode:
when the application data packet is transmitted, a user plane function (UPF) device that processes the application data packet has a service area, and when a user equipment (UE) moves, if the UE leaves the service area, the UPF device that processes the application data packet needs to be reselected, or
when the UE moves, at least one UPF device in the PDU session is reselected.

12. A device, comprising:
a memory storage comprising instructions; and
one or more processors in communication with the memory, wherein the one or more processors execute the instructions to:
obtain first information, wherein the first information is used to determine a processing manner of an application data packet in a fourth mode,
there are three main modes corresponding to a packet data unit (PDU) session including session and service continuity (SSC) mode 1, SSC mode 2, and SSC mode 3,
the fourth mode describes a feature of data transmission of an application and a feature of service continuity of a PDU session, and
the processing manner includes transmitting the application data packet in the fourth mode through a PDU session for transmitting an application data packet in SSC mode 1, or transmitting the application data packet in the fourth mode through a PDU session for transmitting only the application data packet in the fourth mode; and
process the application data packet in the fourth mode in the processing manner.

13. The device according to claim 12, wherein the one or more processors execute the instructions to:
obtain the first information preconfigured by a terminal device.

14. The device according to claim 12, wherein when the processing manner is transmitting the application data packet in the fourth mode through the PDU session for transmitting only the application data packet in the fourth mode, the one or more processors execute the instructions to:
determine, the PDU session in the fourth mode, and transmitting the application data packet in the fourth mode on the PDU session.

15. The device according to claim 12, wherein
when the processing manner is transmitting the application data packet in the fourth mode through the PDU session for transmitting only the application data packet in the fourth mode, the one or more processors execute the instructions to:
triggering, establishment of the PDU session in the fourth mode, and transmitting the application data packet in the fourth mode on the PDU session.

16. The device according to claim 12, wherein
when the processing manner is transmitting the application data packet in the fourth mode through the PDU session for transmitting the application data packet in the SSC mode 1, the one or more processors execute the instructions to:
determine, the PDU session in the SSC mode 1, and transmitting the application data packet in the fourth mode on the PDU session.

17. The device according to claim 12, wherein
when the processing manner is transmitting the application data packet in the fourth mode through the PDU session for transmitting the application data packet in the SSC mode 1, the one or more processors execute the instructions to:
trigger establishment of the PDU session in the SSC mode 1, and transmitting the application data packet in the fourth mode on the PDU session.

18. The device according to claim 12, wherein, according to the fourth mode, the one or more processors execute the instructions to:
when the application data packet is transmitted, a user plane function (UPF) device that processes the application data packet has a service area, and when a user equipment (UE) moves, if the UE leaves the service area, the UPF device that processes the application data packet needs to be reselected, or
when the UE moves, at least one UPF device in the PDU session is reselected.

* * * * *